US008543520B2

(12) United States Patent
Diao

(10) Patent No.: US 8,543,520 B2
(45) Date of Patent: Sep. 24, 2013

(54) NAVIGATION SYSTEM WITH SINGLE PASS CLUSTERING BASED TEMPLATE GENERATION MECHANISM AND METHOD OF OPERATION THEREOF

(75) Inventor: Qian Diao, Cupertino, CA (US)

(73) Assignee: Telenav, Inc., Sunnyvale, CA (US)

( * ) Notice: Subject to any disclaimer, the term of this patent is extended or adjusted under 35 U.S.C. 154(b) by 377 days.

(21) Appl. No.: 13/044,150

(22) Filed: Mar. 9, 2011

(65) Prior Publication Data

US 2012/0232788 A1 Sep. 13, 2012

(51) Int. Cl.
*G06F 15/18* (2006.01)
*G06F 7/00* (2006.01)

(52) U.S. Cl.
USPC ............................................. 706/12; 707/737

(58) Field of Classification Search
None
See application file for complete search history.

(56) References Cited

U.S. PATENT DOCUMENTS

| 6,446,061 | B1 | 9/2002 | Doerre et al. | |
|---|---|---|---|---|
| 2007/0282785 | A1* | 12/2007 | Fayyad et al. | 707/1 |
| 2009/0006382 | A1* | 1/2009 | Tunkelang et al. | 707/5 |
| 2012/0296902 | A1* | 11/2012 | Deolalikar et al. | 707/737 |

OTHER PUBLICATIONS

Heyer et al, MAGIC Tool: integrated microarray data analysis, 2005.*
Asharaf et al., "An adaptive rough fuzzy single pass algorithm for clustering large data sets", Pattern Recognition, The Journal of the Pattern Recognition Society, 2003, pp. 3015-3018, vol. 36, Publisher: Pergamon, Published in: Bangalore, India.
Beringer et al., "Online Clustering of Parallel Data Streams", Data & Knowledge Enginerring, pp. 1-29, Publisher: Fakultat fur Informatik, Otto-von-Guericke-Universitat, Published in: Magdeburg, Germany, 2006.
Bryan et al., "Combining Cluster Sampling with Single Pass Methods for Efficient Sampling Regimen Design", pp. 1-8, Publisher: Center for Efficient, Secure and Reliable Computing, North Carolina State University, Published in: Raleigh, USA, 2007.
Elghazel et al., "A Graph-based Approach for Dynamic Clustering", pp. 1-4, Publisher: LIESP Laboratory, Claude Bernard University of Lyon I, France, Published in: Lyon, France, on or before Mar. 8, 2011.
Klampanos et al., "Single-Pass Clustering for Peer-to-Peer Information Retrieval: The Effect of Document Ordering", pp. 1-8, Publisher: Univeristy of Glasgow, Published in: Glasgow, Scotland, 2006.

(Continued)

*Primary Examiner* — Jeffrey A Gaffin
*Assistant Examiner* — Mikayla Chubb

(57) ABSTRACT

A method of operation of a navigation system includes: extracting navigation-related web documents having a point of interest; generating formatting sequences of the navigation-related web documents; selecting a user-defined percentile representing reciprocal fraction of an expected number of clusters; calculating a threshold value for a first cluster with the threshold value to be equal to the user-defined percentile of a first normalized distribution of sample comparison values between the first cluster and formatting sequence samples from the formatting sequences, the first cluster is from the clusters; computing an associated comparison value between a first formatting sequence from the formatting sequences and the first cluster; grouping the first formatting sequence with the first cluster when the associated comparison value exceeds the threshold value for the first cluster; and generating a travel route for the point of interest related to the first cluster for displaying on a device.

18 Claims, 13 Drawing Sheets

(56) References Cited

OTHER PUBLICATIONS

Kuo et al., "Cross Document Event Clustering Using Knowledge Mining from Co-Reference Chains", pp. 1-14, Publisher: Department of Computer Science and Information Engineering, National Taiwan University, Published in: Taipei, Taiwan, 2007.

Manning et al., "An Introduction to Information Retrieval", Online edition (c) 2009 Cambridge UP, Apr. 1, 2009, pp. 1-581, Publisher: Cambridge University Press, Published in: Cambridge, England.

Papka et al., "On-Line New Event Detection using Single Pass Clustering", University of Massachusetts, Department of Computer Science, pp. 1-10, Published in: Massachusetts, USA, 1998.

Reyzin, "Online Clustering of Linguistic Data", Junior Independent Work, 2005, pp. 1-15, Publisher: Princeton University Class of 2005, BSE, Published in: Princeton, USA.

Wang et al., "A Visual Mining System for Theme Development Evolution Analysis of Scientific Literature", International Journal of Digital Content Technology and its Applications, Jun. 2010, pp. 1-9, vol. 4, No. 3, Published in: China.

* cited by examiner

United States Patent US 8,543,520 B2

NAVIGATION SYSTEM WITH SINGLE PASS CLUSTERING BASED TEMPLATE GENERATION MECHANISM AND METHOD OF OPERATION THEREOF

TECHNICAL FIELD

The present invention relates generally to a navigation system, and more particularly to a system for single pass clustering based template generation mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world". One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information. However, a failure to extract all the fields and align the fields from one document to another document continues to be a paramount concern for the consumer.

Thus, a need still remains for a navigation system with single pass clustering based template generation mechanism to generate a document that can extract and align all the fields from a source document to a revised version of the document. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: extracting navigation-related web documents having a point of interest; generating formatting sequences of the navigation-related web documents; selecting a user-defined percentile representing reciprocal fraction of an expected number of clusters; calculating a threshold value for a first cluster with the threshold value to be equal to the user-defined percentile of a first normalized distribution of sample comparison values between the first cluster and formatting sequence samples from the formatting sequences, the first cluster is from the clusters; computing an associated comparison value between a first formatting sequence from the formatting sequences and the first cluster; grouping the first formatting sequence with the first cluster when the associated comparison value exceeds the threshold value for the first cluster; and generating a travel route for the point of interest related to the first cluster for displaying on a device.

The present invention provides a navigation system, including: an extraction module, for extracting navigation-related web documents having a point of interest; a feature generation module, coupled to the extraction module, for generating formatting sequences of the navigation-related web documents; a systems setting module for selecting a user-defined percentile representing reciprocal fraction of an expected number of clusters; a threshold generator module, coupled to the systems setting module, the document processing module, and the clusters module, for calculating a threshold value for a first cluster with the threshold value to be equal to the user-defined percentile of a first normalized distribution of sample comparison values between the first cluster and formatting sequence samples from the formatting sequences, the first cluster is from the clusters; a comparison module, coupled with the feature generation module, and the threshold generator module, for computing an associated comparison value for computing an associated comparison value between a first formatting sequence from the formatting sequences and the first cluster; a grouping module, coupled with the comparison module, the document processing module, and the threshold generator module, for grouping the first formatting sequence with the first cluster when the associated comparison value exceeds the threshold value for the first cluster; and a route generation module, coupled with the grouping module, for generating a travel route for the point of interest related to the first cluster for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
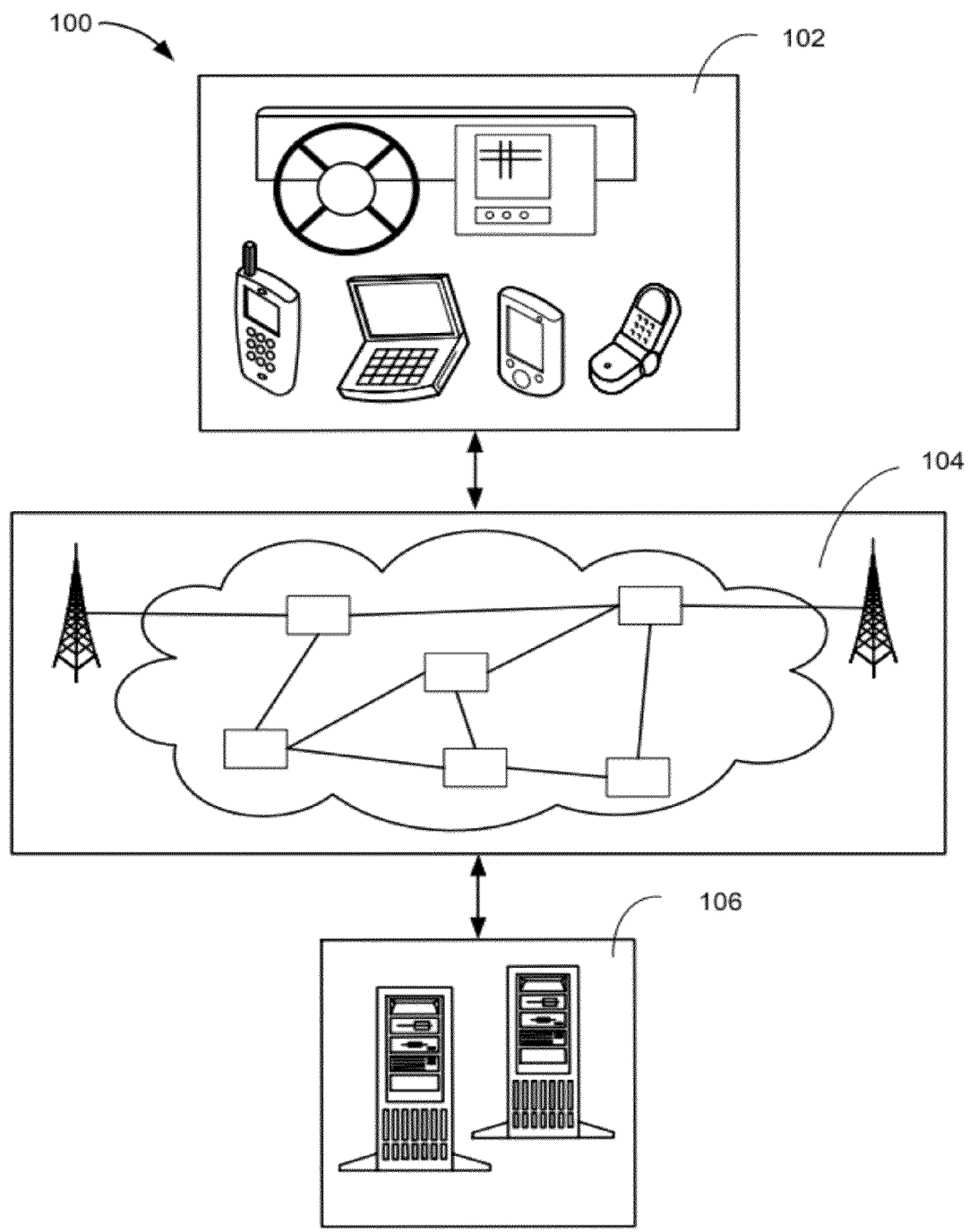
FIG. 1 is a navigation system with single pass clustering based template generation mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "navigation-related information" or "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with single pass clustering based template generation mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
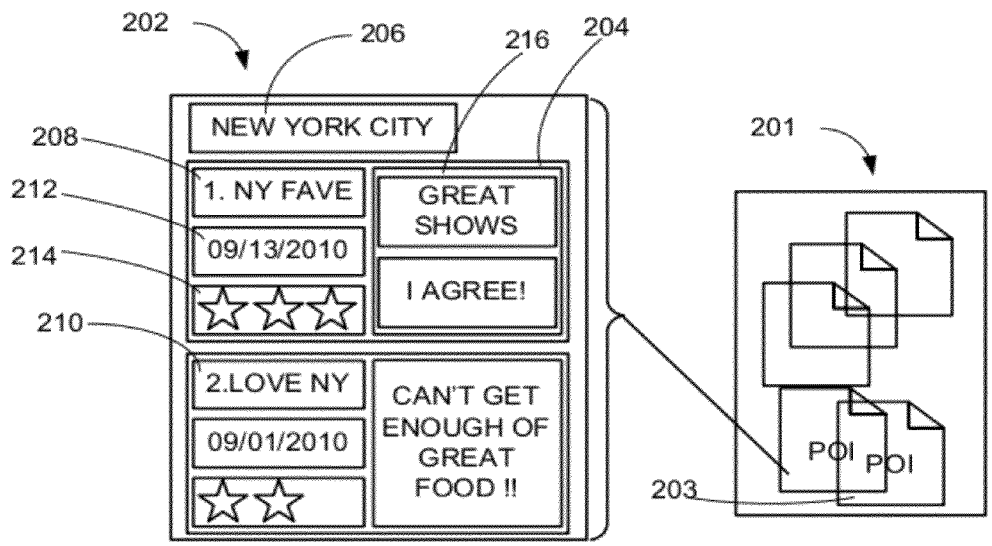
FIG. 2 is an example of an original document for a point of interest.

Referring now to FIG. 2, therein is shown an example of an original document 202 for a point of interest 206. The original document 202 can be one of documents 201. The documents 201 are digital files containing real world information on storage devices, such as the first device 102 of FIG. 1, and the second device 106 of FIG. 1. The documents 201 can include navigation-related web documents 203.

The navigation-related web documents 203 are defined as web documents containing navigation-related information regarding point of interest 206. The original document 202 is defined as one of the navigation-related web documents 203 accessed by the navigation system 100 for a review 204 of the point of interest 206. The point of interest 206 is defined as the physical location where the user of the navigation system 100 is interested to reach at the end of the travel. The review 204 is defined as a critique, a comment, or a combination thereof regarding the point of interest 206 and all related information about the critique, comment, or the combination.

For example, the point of interest 206 can be New York City. The review 204 can be comments of New York City made by travelers who had visited New York City, and other information regarding the comments, such as when, where, from who, why, and how the comments are submitted. The original document 202 can represent a travel document, such as www.tripadvisor.com™. The original document 202 can include the review 204 of New York City by travelers who had traveled to New York City. The original document 202 can also include multiple numbers of the review 204. In this example, the original document 202 can include two types of the review 204 with a travel review title 208 of "NY FAVE" and "LOVE NY."

The review 204 can present one of fields 210, such as the travel review title 208, a travel review time 212, a travel review rating 214, a travel review content 216, or a combination thereof. The fields 210 are defined as particular areas on the review 204 that provide information to the viewer. For example, one of the fields 210 can represent the travel review title 208.

The travel review title 208 is defined as a heading that specifies the title of the review 204. For example, the first of the travel review title 208 of the review 204 can represent "NY FAVE" and the second of the travel review title 208 of the review 204 can represent "LOVE NY."

The travel review time 212 is defined as the time when the submission of the review 204 was made to the original document 202. For example, the travel review time 212 can represent "Sep. 13, 2010."

The travel review rating 214 is defined as an appraisal value submitted as part of the review 204 to the original document 202 by the travelers to rate the point of interest 206. For example, one traveler can rate three stars as the travel review rating 214 and another traveler can rate two stars as the travel review rating 214 for New York City at the original document 202.

The travel review content 216 is defined as a summary of critique, comment, or a combination thereof submitted as part of the review 204 to the original document 202. For example, one traveler can write, "Can't get enough of great food!!" as the travel review content 216 for visiting New York City.

Figure 3:
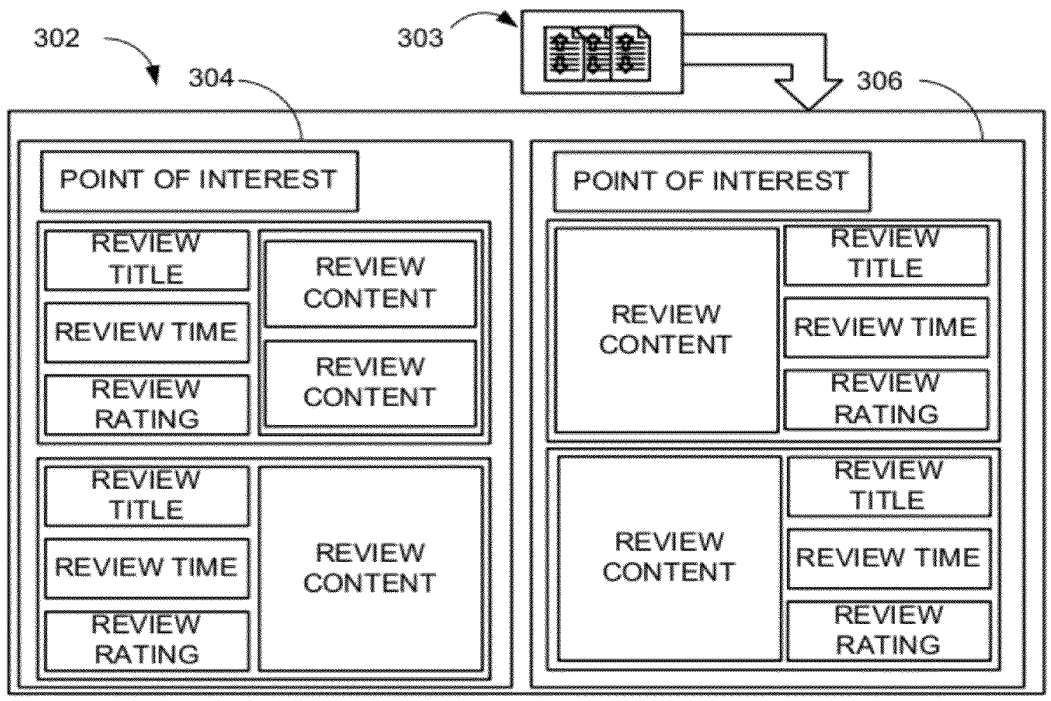
FIG. 3 is an example of templates of the documents of FIG. 2, including a first template and a second template.

Referring now to FIG. 3, therein is shown an example of templates 302 of the documents 201 of FIG. 2, including a first template 304 and a second template 306. The templates 302 are defined as pre-defined formatting arrangements for insertion or extraction of contents, where the contents are presented in the same formatted arrangement.

The documents 201 can be interpreted and displayed by their corresponding formatting sequences 303. The formatting sequences 303 are sets of code describing how documents should be presented and displayed, such as by standard protocols. For example, the standard protocols can represent Hyper Text Markup Language (HTML), Extensible Markup Language (XML), or a combination thereof. The first template 304 and the second template 306 can use pre-defined formatting sequences for formatting and displaying documents. Each template can have designated areas to display specific types of contents. Each designated area can correspond to an expression of the standard protocols, which can define the formatting arrangement for that designated area.

Extraction of navigation-related information can require a substantially complete understanding of the formatting of a document. For example, because the first template 304 includes an arrangement for a location for a review content field differently from another location for the review content field in the second template 306, the extraction rules of navigation-related information from a document generated via the first template 304 must be different from the extraction rules of navigation-related information from a document generated via the second template 306.

Figure 4:
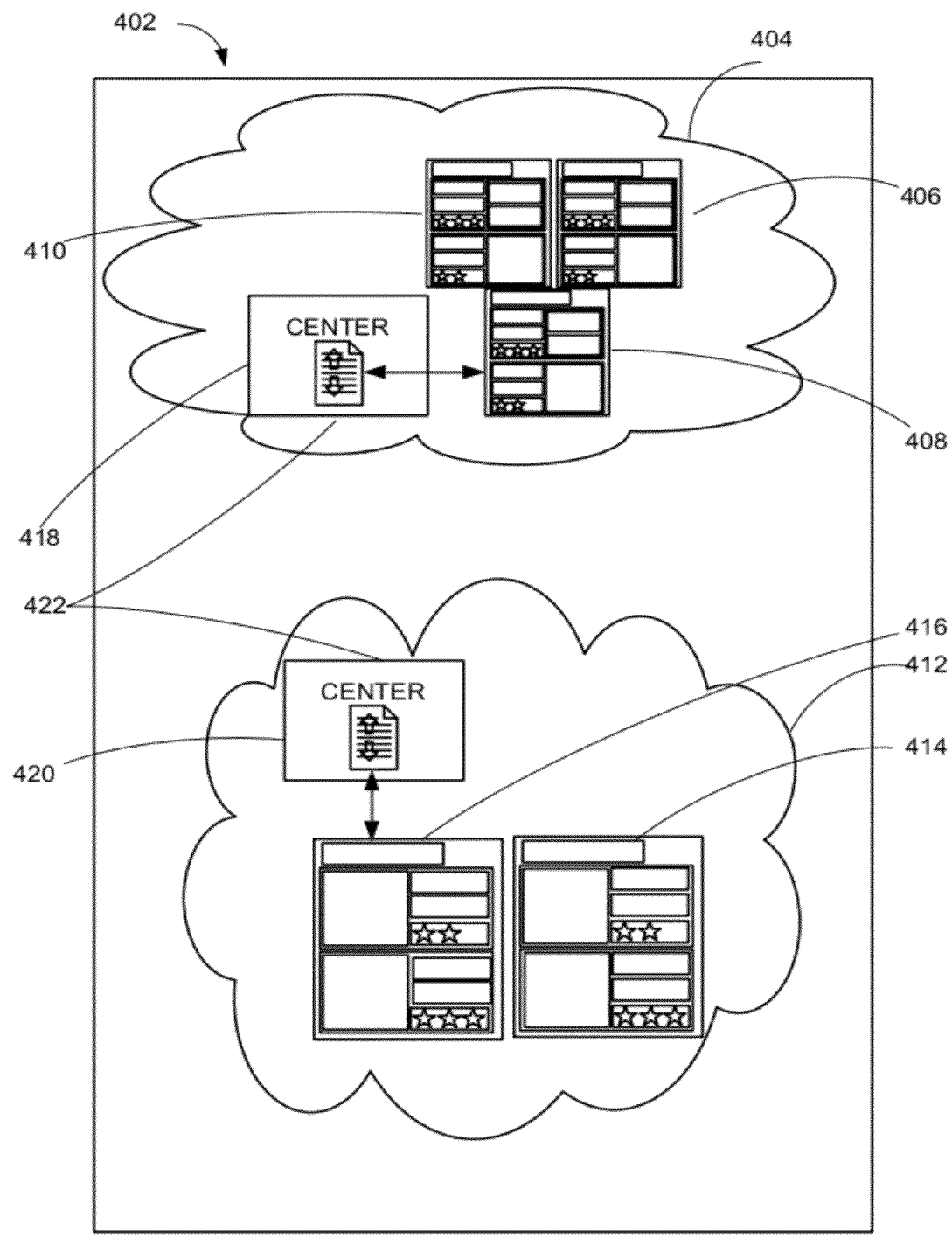
FIG. 4 is an example of clusters based on the templates of FIG. 3 used in the formations of the documents of FIG. 2.

Referring now to FIG. 4, therein is shown an example of clusters 402 based on the templates 302 of FIG. 3 used in the formations of the documents 201 of FIG. 2. The clusters 402 are defined as sets of documents grouped together because of some shared similarity in each of the sets, such as use of the same template in generating the documents in each of the clusters 402.

The clusters 402 can include a first cluster 404. The first cluster 404 is an instance of the clusters 402. The first cluster 404 can include a first document 406, a second document 408, and a third document 410. The first document 406, the second document 408, and the third document 410 are each instances of the documents 201, and each can be the original document 202 of FIG. 2 containing the review 204 of FIG. 2. The first document 406, the second document 408, and the third document 410 share the first template 304 of FIG. 3 that is the same, for example.

A second cluster 412 can be an instance of the clusters 402. The second cluster 412 can include a fourth document 414 and a fifth document 416. The fourth document 414 and the fifth document 416 can share the same second template 306 of FIG. 3. The first, second, third, fourth, and fifth documents can all be instances of the documents 201.

The clusters 402 can have centers 422. The centers 422 are instances of the formatting sequences 303. Each of the centers 422 of the clusters 402 is a formatting sequence used for comparison between another formatting sequence and each of the clusters. Each of the centers 422 can be chosen by a pre-defined rule, such as the first formatting sequence or first document to be grouped with each of the clusters 402.

The first cluster 404 can have a first cluster center 418. The first cluster center 418 is an instance of the centers 422 for the first cluster 404. The second cluster 412 can have a second cluster center 420. The second cluster center 420 is an instance of the centers 422. For example, the formatting sequence of the second document 408 can be the first cluster center 418 for the first cluster 404. The formatting sequence for the fifth document 416 can be the second cluster center 420.

Figure 5:
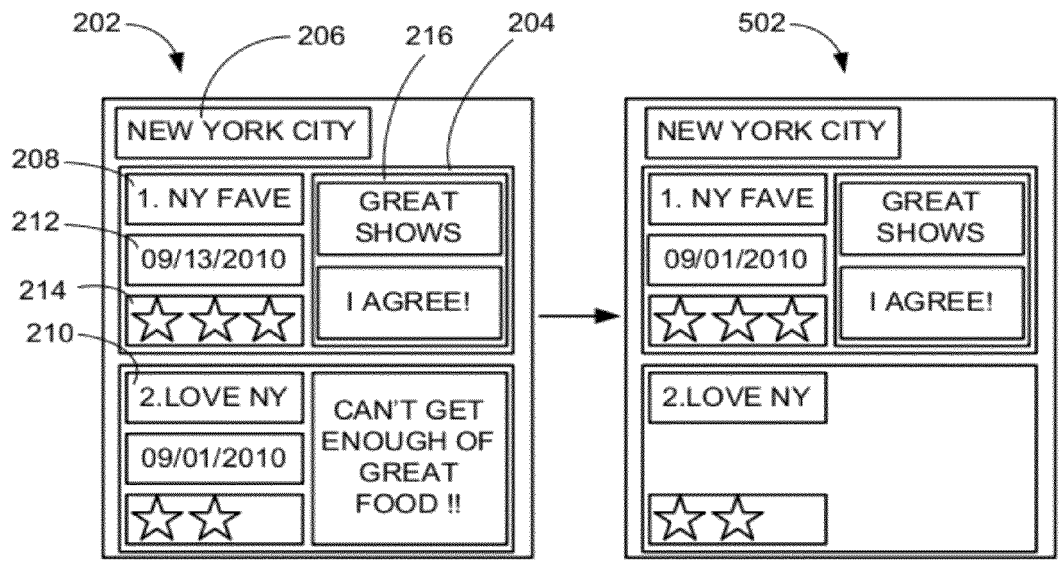
FIG. 5 is an example of an extracted document failing to include some of the fields for the review from the original document.

Referring now to FIG. 5, therein is shown an example of an extracted document 502 failing to include some of the fields 210 for the review 204 from the original document 202. The extracted document 502 is defined as a document with an extraction of the fields 210 of the review 204 from the original document 202.

For example, the original document 202 is illustrated in FIG. 2. A system without single pass clustering based template generation mechanism can generate the extracted document 502. Without the benefit of utilizing the present invention, the extracted document 502 can have some of the fields 210 missing, as the system without single pass clustering based template generation mechanism can fail to extract all of the fields 210 from the review 204. Additionally, the system without single pass clustering based template generation mechanism can fail to extract at least one of the fields 210 that is for the review 204.

For example, the first submission of the review 204 for the extracted document 502 can include the travel review title 208, but fail to include the travel review time 212 for the first submission of the review 204. Instead, the extracted document 502 can include the travel review time 212 for the second submission of the review 204 for the first submission of the review 204. As further example, the second of the review 204 can fail to include the travel review content 216 and the travel review time 212.

Figure 6:
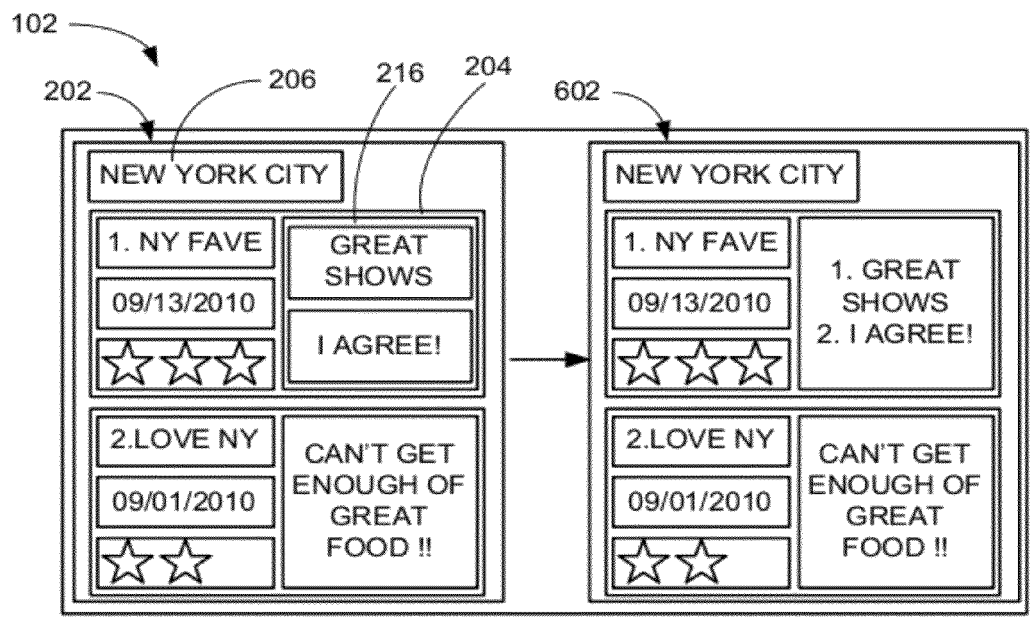
FIG. 6 is an example of the navigation system extracting all of the fields for the review from the original document to generate a point-of-interest page.

Referring now to FIG. 6, therein is shown an example of the navigation system 100 extracting all of the fields 210 for the review 204 from the original document 202 to generate a point-of-interest page 602. The point-of-interest page 602 is defined as a document that the navigation system 100 had generated by extracting all of the fields 210 of the review 204 from the original document 202. For example, the original document 202 is illustrated in FIG. 2. The navigation system 100 can generate the point-of-interest page 602 by compiling all of the fields 210 presented in the review 204 of the original document 202. The point-of-interest page 602 includes all of the fields 210 presented in the review 204 because the extraction method employed by the navigation system 100 can in fact be error-free unlike the example in FIG. 5.

Figure 7:
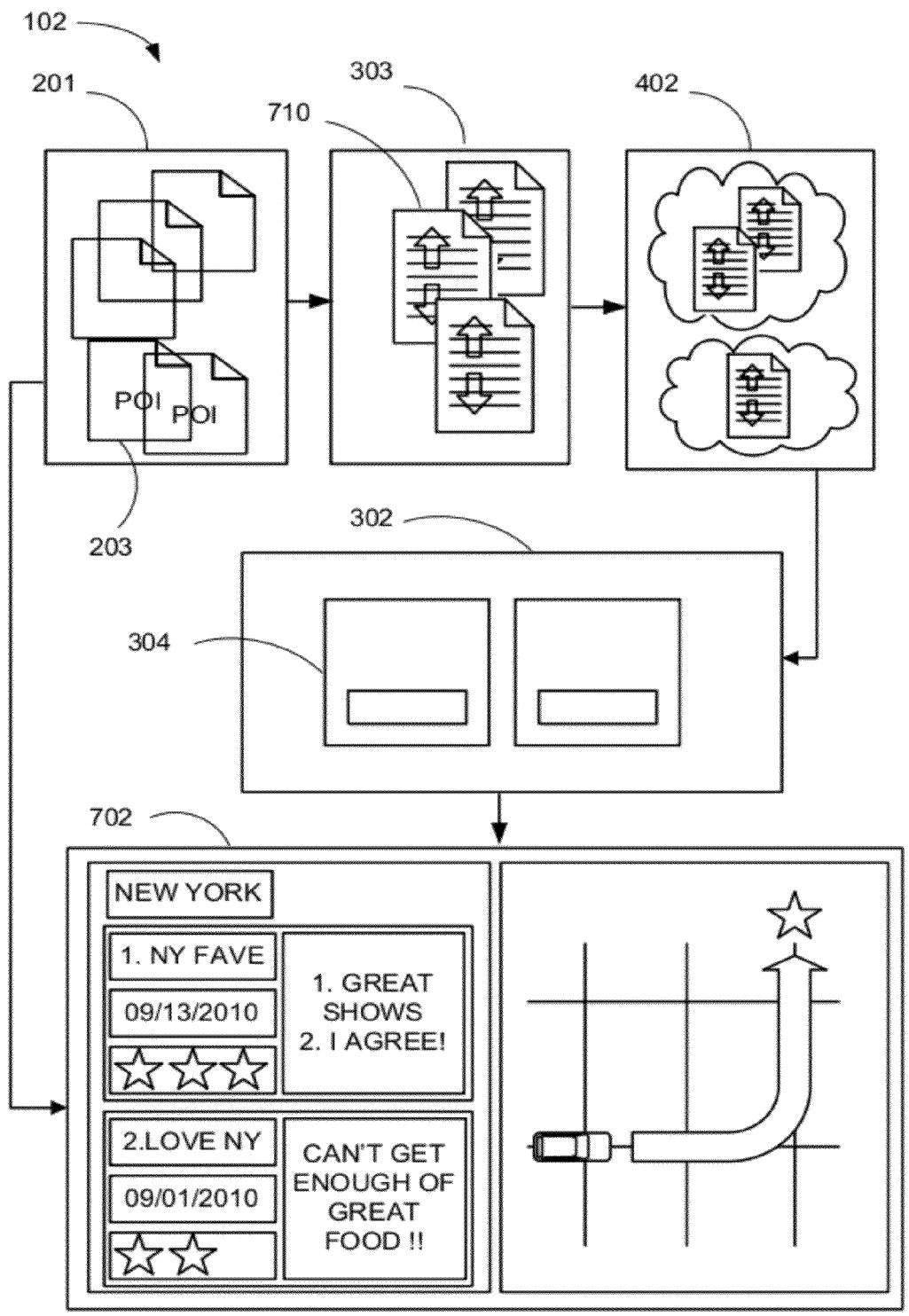
FIG. 7 is an example of the navigation system generating a travel guide for the point of interest of FIG. 2 from the clusters of the documents.

Referring now to FIG. 7, therein is shown an example of the navigation system 100 generating a travel guide 702 for the point of interest 206 of FIG. 2 from the clusters 402 of the documents 201. The travel guide 702 is defined as a display of point of interest related information extracted from the documents 201.

The navigation system 100 can extract the documents 201 from the World Wide Web or other sources. The navigation system 100 can then extract the formatting sequences 303 from the documents 201 including a first formatting sequence 710. Extraction of the formatting sequences 303 is a process involving reading the digital information contained from the sources of the documents 201, and converting them to a language of standard protocols that describes the formats of the documents 201. The first formatting sequence 710 is one instance of the formatting sequences 303. The navigation system 100 can then group the formatting sequences 303 into the clusters 402. The navigation system 100 can then generate the templates 302 from the clusters 402.

Each of the templates 302 can define or transform into a set of parsing rules on standard or pre-defined protocols that applies to a group of documents to extract information or navigation-related information from therein, such as the first template 304. The navigation system 100 can generate the travel guide 702 for the point of interest 206. Display of the travel guide 702 is further explained in FIG. 8.

Figure 8:
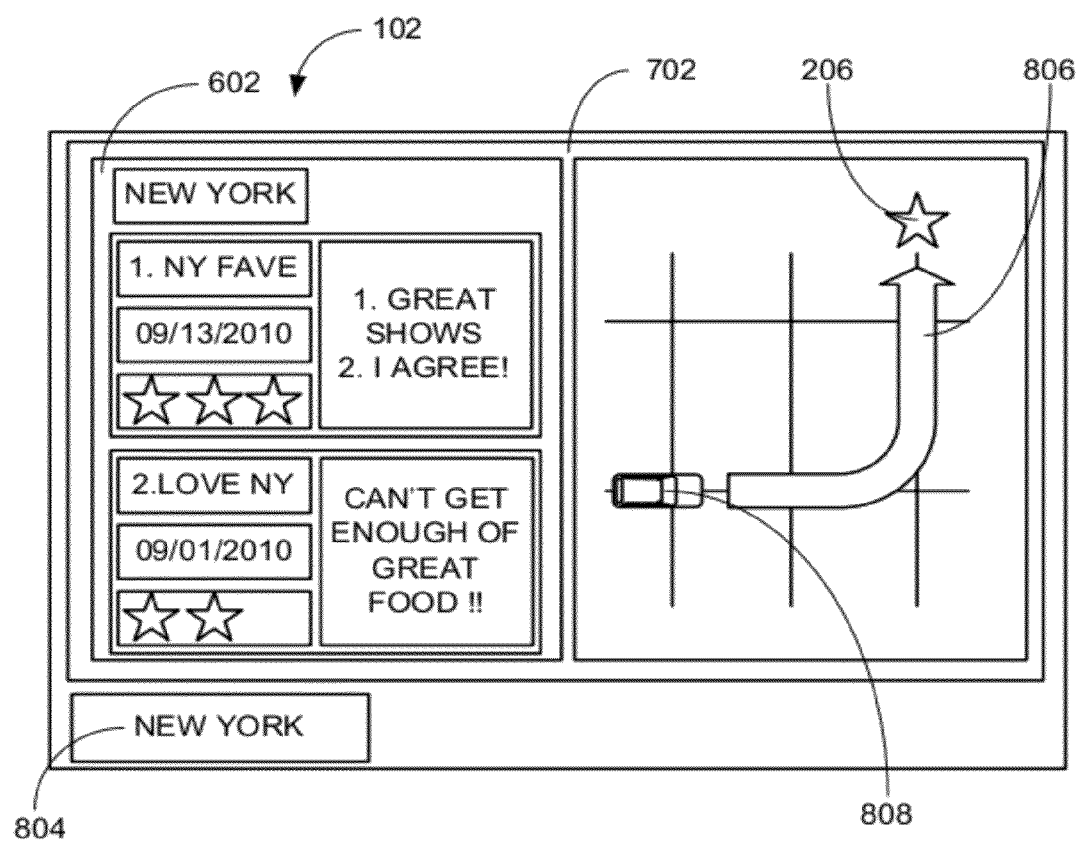
FIG. 8 is a display example of the travel guide for the navigation system.

Referring now to FIG. 8, therein is shown a display example of the travel guide 702 for the navigation system 100. The travel guide 702 can include the point-of-interest page 602 generated by the navigation system 100.

An entry 804 is defined as a selection into the first device 102 or the second device 106 of FIG. 2 made by the user, the navigation system 100, or a combination thereof from the point-of-interest page 602 to reach the point of interest 206. For example, the entry 804 can represent a manual entry, an oral command, or a combination thereof.

A travel route 806 is defined as a path that a vehicle or a person with the navigation system 100 can take to reach from a current location 808 to the point of interest 206. The current location 808 is defined as the current physical location of the navigation system 100. For example, the travel route 806 can represent a path from the current location 808 representing Edgewater, N.J. to the point of interest 206 representing New York City. The travel route 806 can be included in the travel guide 702.

Figure 9:
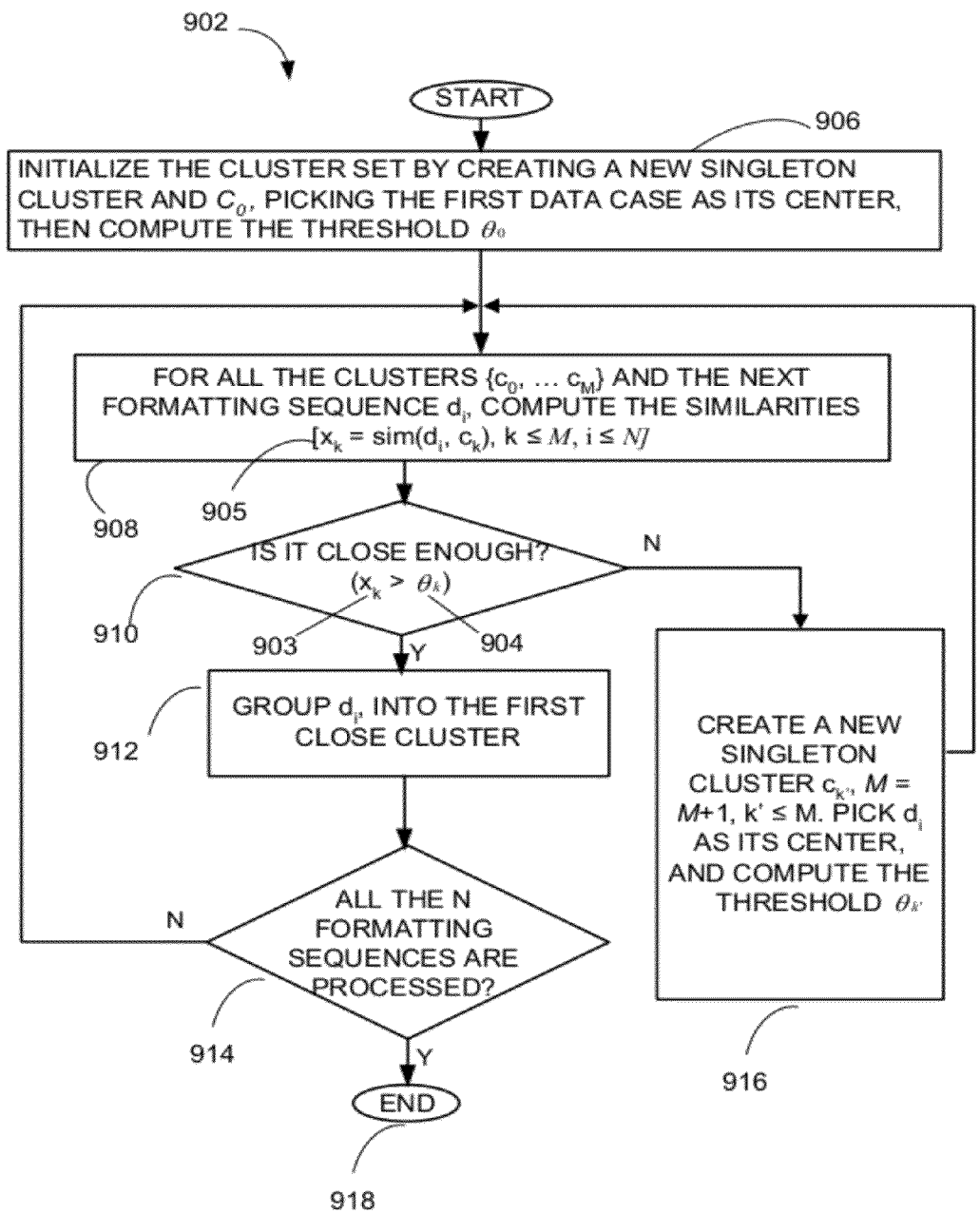
FIG. 9 is a flowchart of an example of a single pass clustering method of the navigation system for generating the clusters of FIG. 4.

Referring now to FIG. 9, therein is shown a flowchart of an example of a single pass clustering method 902 of the navigation system 100 for generating the clusters 402 of FIG. 4. A clustering method can categorize the documents 201 of FIG. 2 based on the documents' similarities or differences. The single pass clustering method 902 is a type of clustering method where a particular document is grouped or not grouped to a particular cluster by evaluating whether an associated comparison value 903 between the particular document and the particular cluster is greater than a threshold value 904.

The threshold value 904 is a comparison value used to determine whether or not to group a formatting sequence or a document into a cluster. Each of comparison values 905 is defined as a measure of how similar or how different a document is from another document or cluster. The comparison values 905 can be implemented by a measure of distance between pairs of observations regarding the formatting sequences 303 of FIG. 3, such as the Euclidean distance or the Mahalanobis distance. The comparison values 905 can also be implemented by measuring the alignment match between pairs of the formatting sequences 303.

It has been discovered that the single pass clustering method 902 has the advantage of being adaptable to different clustering applications. The single pass clustering method 902 can use any valid measure of document comparison to evaluate how similar documents are compared to each other. Documents can be compared without converting documents into numeric values. The single pass clustering method 902, thereby, is highly adaptable to different cluster applications for different types of documents.

It has also been discovered that the single pass clustering method 902 has the advantage of being scalable to cluster a larger number of formatting sequences. The clustering method has linear complexity and can take the formatting sequences 303 sequentially. A linear complexity method is one where time taken to group the formatting sequences 303 is proportional to the total number of formatting sequences processed. The single pass clustering method 902 is therefore capable of clustering a larger number of the formatting sequences 303 without having the computation time grow polynomially or exponentially.

As a specific example, the single pass clustering method 902 can include: initializing the clusters 402 by creating a new initial cluster $c_0$, and picking an ungrouped one of the formatting sequences 303 as the center of the new initial cluster, then compute an initial cluster threshold for the new initial cluster in a block 906; for all clusters and a further one of the formatting sequences 303 $d_i$, computing the comparison values 905 in a block 908; checking whether the associated comparison value 903 between the further formatting sequence and a further one of the clusters 402 is greater than the threshold value 904 of the further cluster in a block 910; grouping the further formatting sequence into the further cluster if the block 910 responds "yes" in a block 912; proceeding again to the block 908 if all of the formatting sequences 303 have not been processed in a block 914; creating a new singleton cluster if the block 910 responds "no", while picking a next formatting sequence as the new singleton cluster's center in a block 916; and terminating the method if all formatting sequences are processed in a block 918.

Under the single pass clustering method 902, each of the clusters 402, denoted $c_k$, will have its own threshold $\theta_k$ for its scope definition. The clusters 402 $c_k$ have the centers 422 of FIG. 4. For example, the associated comparison value 903 between the first formatting sequence 710 of FIG. 7 and the first cluster 404 can be same as the comparison value between the first formatting sequence 710 and the first cluster center 418 of FIG. 4. The associated comparison value 903 between a formatting sequence $d_i$ and the cluster $c_k$'s center is formulated as:

$$x_k = similarity(d_i, c_k), k \leq M, i \leq N. \quad \text{Equation 1}$$

If $x_k > \theta_k$, then the formatting sequence is deemed as close enough to the cluster $c_k$ and it could be merged into the cluster. If $x_k \leq \theta_k$, then the formatting sequence will be isolated as a new singleton cluster whose center is $d_i$.

It has been discovered that the present invention provides the navigation system 100 to extract point-of-interest related information accurately. The navigation system 100 can estimate the threshold value 904 for the single pass clustering method 902 dynamically, and removing the need for setting the threshold value 904 manually. This new dynamic thresholding strategy of finding an appropriate threshold value to determine whether or not to put a formatting sequence into a cluster provides stability to the single pass clustering method 902 even when the nature of documents analyzed changes. Accuracy generally degrades for a point of interest information extraction method when nature of documents changes, but not if the extraction method adapts dynamically. The navigation system 100 thereby provides improved accuracy in point-of-interest related information extraction by estimating the threshold value 904 dynamically.

Figure 10:
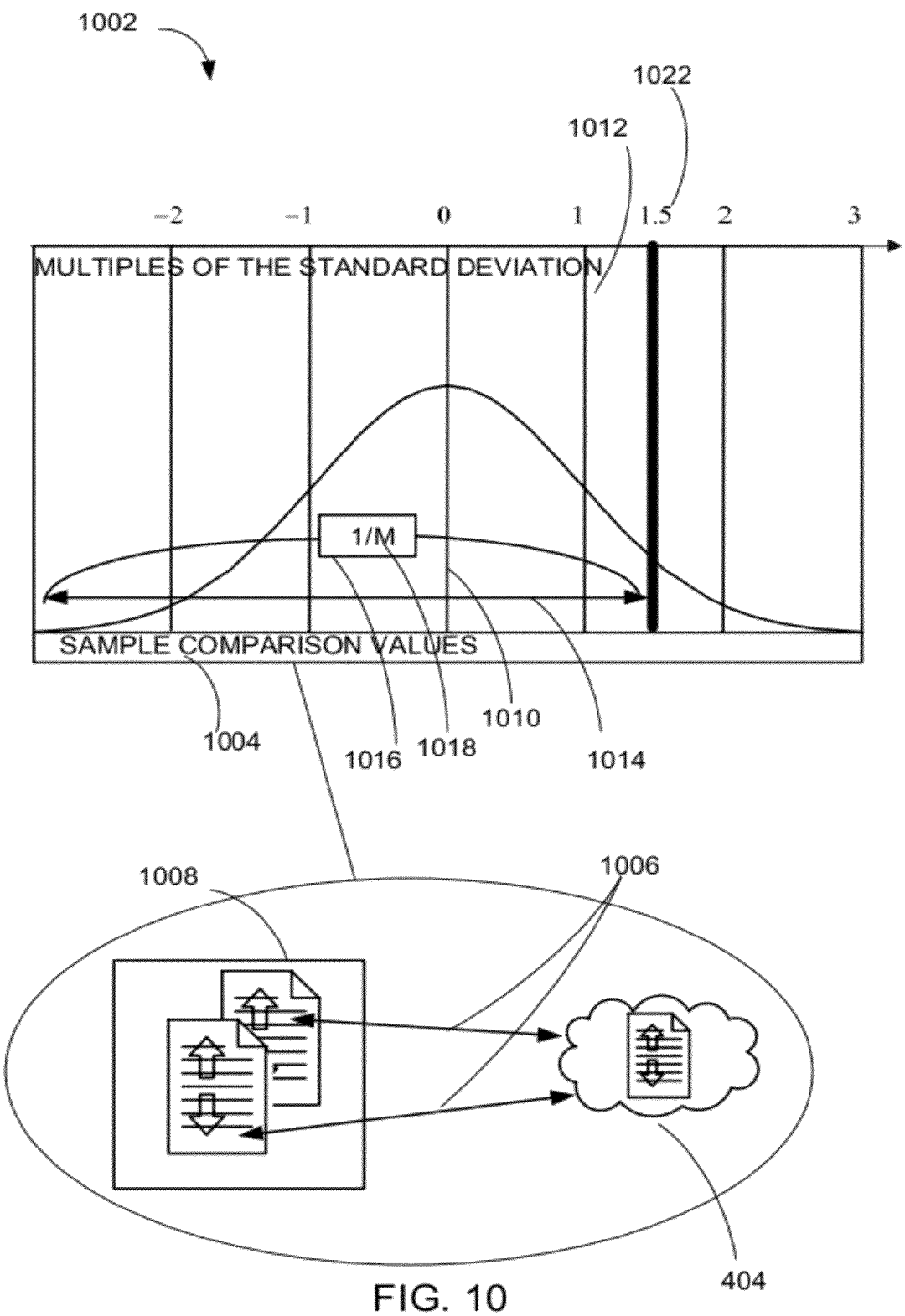
FIG. 10 is a first normalized distribution of sample comparison values calculated from matching pairs between formatting sequence samples and the first cluster of FIG. 4.

Referring now to FIG. 10, therein is shown a first normalized distribution 1002 of sample comparison values 1004 calculated from matching pairs 1006 between formatting sequence samples 1008 and the first cluster 404 of FIG. 4. The formatting sequence samples 1008 are a random sampling of the formatting sequences 303 of FIG. 3, used to approximate the actual mean and actual standard deviation of the comparison values 905 of FIG. 9 between the first cluster 404 and all of the formatting sequences 303. The matching pairs 1006 are defined as associations between each of the formatting sequence samples 1008 and the first cluster 404, pending comparison. The sample comparison values 1004 are defined as the comparison values between the matching pairs 1006.

The navigation system 100 creates the formatting sequence samples 1008 by sampling the formatting sequences 303. Each of the formatting sequence samples 1008 are matched to the first cluster 404, creating the matching pairs 1006. Then the sample comparison values 1004 are calculated for each of the matching pairs 1006. The sample comparison values 1004 are used to calculate the first normalized distribution 1002.

The first normalized distribution 1002 is a normal approximation of the sample comparison values 1004, useful to determine the threshold value 904 of FIG. 9 that can be used in the single pass clustering method 902 of FIG. 9. The first normalized distribution 1002 includes a sample mean 1010, and a sample standard deviation 1012. The sample mean 1010 is a statistical average of the sample comparison values 1004. The sample standard deviation 1012 is a measure of variability of the sample comparison values 1004. Equation 2 and Equation 3 describe how to calculate the sample mean 1010 and the sample standard deviation 1012.

The sample mean is:

$$\overline{X}_k = \frac{\sum_{i=1}^{N'} sim(c_k, d_i)}{N'} \quad \text{Equation 2}$$

and the sample variance is:

$$S_k = \sqrt{\frac{\sum_{i=1}^{N'} (sim(c_k, d_i) - \overline{X}_k)^2}{N' - 1}}. \quad \text{Equation 3}$$

In Equation 2 and 3, N' denotes the sample size of the sample comparison values 1004, which is less than the actual total number of the comparison values 905 of FIG. 9.

One can make an assumption that the sample comparison values 1004 are distributed approximately normally because the normal distribution can be used to describe, at least approximately, any variable that tends to cluster around the mean. Under the assumption that the sample comparison values 1004 follow a normal distribution, an instance of the comparison values 905 corresponding to a percentile rank can be determined by a T-Table for the first normalized distribution 1002. The percentile rank of a particular comparison value is defined as the probability that the particular comparison value in the first normal distribution 1002 is greater than or equal to all of the sample comparison values 1004 in the first normal distribution 1002.

For example, if the first formatting sequence 710 of FIG. 7 has the associated comparison value with the first cluster center 418 of FIG. 4 of 0.9 and this value is greater than or equal to 88% of the sample comparison values 1004, then the percentile rank of the formatting sequence associated with the cluster would be 88. The T-Table can convert the percentile rank to a multiplier 1022 of the sample standard deviation 1012. With the multiplier 1022, the sample mean 1010, and the sample standard deviation 1012, one can determine an instance of the comparison values 905 that correspond to the percentile rank. The instance of the comparison values 905 is equal to the sample mean 1010 plus the sample standard deviation 1012 multiply by the multiplier 1022.

The percentile rank discussed above can be set to an intra-cluster similarity fraction, defined as equal to one over the total number of clusters, in order to calculate the threshold value 904 for the single pass clustering method 902. The intra-similarity fraction is the fraction of comparison values 905 that are between formatting sequences in a particular cluster. Assuming all of the clusters 402 of FIG. 4 have the same number of the formatting sequences 303, then the intra-similarity fraction is one over the total number of the clusters 402.

For example, the percentile rank can be set to a user-defined percentile 1014 representing reciprocal fraction 1016 of an expected number 1018 of the clusters 402. The expected number 1018 of the clusters 402 is an approximation of how many clusters would be generated when clustering the formatting sequences 303. The expected number 1018 of the clusters 402 can further be an approximation of how many types of the templates 302 of FIG. 3 are used to generate the documents 201 of FIG. 2. The reciprocal fraction 1016 is simply defined as a numeric fraction of one over the expected number 1018. The user-defined percentile 1014 is the percentile equivalent of the reciprocal fraction 1016.

It has been discovered that the navigation system 100 provides an accurate clustering method for identifying templates to extract navigation-related information for display. The user-defined percentile 1014 is otherwise known as the intra-cluster similarity fraction, which has been discovered as a reliable and efficient threshold value for the single pass clustering method 902. For example, a comparison value of a particular formatting sequence to the first cluster 404 that is greater than the user-defined percentile 1014 of the comparison values 905 more accurately suggests that the particular formatting sequence does not belong to the first cluster 404. Using the threshold value 904 that corresponds to the user-defined percentile 1014 allows the single-pass clustering method 902 to more accurately cluster the formatting sequences 303. The navigation system 100, thereby, can use the single pass clustering method 902 together with the threshold value 904 reflecting the intra-cluster similarity to accurately group the formatting sequences 303.

It has further been discovered that the navigation system 100 further provides a faster clustering method for identifying templates to extract navigation-related information for display and requires less computational power. To calculate the threshold value 904 corresponding to an intra-cluster similarity value can be computationally expensive when total number of the formatting sequences 303 is large. The navigation system 100 uses a fixed number of random samples to estimate the intra-cluster similarity and hence the threshold value, and thereby making the single pass clustering method 902 faster and requiring less computation power.

The multiplier 1022 of how many of the sample standard deviations 1012 above the sample mean 1010 corresponding to the intra-cluster similarity can be found by using a T-Table. The T-Table takes in variables such as degree of freedom df=N'-1, and the percentile rank, mapping these variables to the multiplier 1022 of the sample standard deviations 1012 above the sample mean 1010. The computation of the threshold value 904 is described in Equation 4. The threshold value 904 is denoted by $\theta_k$ and the multiplier 1022 is denoted by t.

$$\theta_k = \overline{X}_k + t S_k.\qquad\text{Equation 4}$$

As a specific example, the navigation system 100 can be applied to the task of clustering template based web pages. More and more of documents on the World Wide Web are based on templates. On a technical level, this causes those documents to have a quite similar source code and DOM tree structure.

Grouping together documents, which are based on the same template, is an important step for information extraction. For instance, point of interest (POI) contents in the websites usually are semi-structured data, which are generated by machines, using a boiler-plate template for page layout and presentation (such as an XSLT file), and databases for actual content. So, the rate of success of POI extraction can be highly impacted by the template detection and clustering, and the different templates will lead to the different extraction rules.

In the example, the templates 302 of FIG. 3 are represented by html tag sequences. The order of the tags in the html tag sequence is consistent with the topological order of the HTML DOM tree. The comparison values 905 of FIG. 9 in the example can be local alignment scores of the tag sequence of the web page pairs. The local alignment scores will be discussed further a later part of the application.

As an example, the navigation system 100 operating the single pass clustering method 902 of FIG. 9 on a dataset of 4260 webpages from www.tripadvisor.com contains four different templates. Six criteria of clustering quality, including purity, Normalized Mutual Information (NMI), Rand Index (RI), F score, precision and recall were used to evaluate the navigation system 100. Purity, NMI, RI, and F measure are all evaluation measures. Bad clustering quality has measure values of purity, NMI, RI, and F measure that are close to 0, and perfect clustering usually has measure values of purity, NMI, RI, and F measure close to 1. Precision and recall are error rate measures, where inaccurate clustering has error rate measures close to 0, and accurate clustering has error rate measures close to 1.

Purity can be an external evaluation criterion for cluster quality, measuring whether the clusters 402 of FIG. 4 contain one single class of the documents 201 of FIG. 2. Clusters containing documents from different classes have purity values close to 0, and clusters containing documents from all the same class have purity value close to 1.

NMI is a clustering quality measure similar to purity but penalizes having too many clusters. Clusters that perfectly recreate the classes of documents without extra clusters would obtain a NMI value of 1.

The Rand index (RI) measures the percentage of decisions that are correct. That is, it penalizes both false positive and false negative decisions during clustering. False positive (FP) decisions are where two dissimilar documents are assigned to the same cluster. False negative (FN) decisions are where two similar documents are assigned to different clusters.

RI is another useful method of evaluating the quality of the single pass clustering method 902 as operated by the navigation system 100. The F measure supports differential weighting of false positives and false negatives, and generally penalizing false negatives more strongly than false positives.

The single pass clustering method 902 can be view as a series of decisions of between pairs of documents. Two documents to the same cluster are assigned if and only if they are similar. A true positive (TP) decision is where two similar documents are assigned to the same cluster; a true negative (TN) decision is where two dissimilar documents are assigned to different clusters. Two types of errors exist as described previously. A (FP) decision assigns two dissimilar documents to the same cluster. A (FN) decision assigns two similar documents to different clusters. So, the precision and recall are computed as in Equations 5 and 6:

$$\text{precision} = \frac{TP}{TP+FP}, \quad \text{Equation 5}$$

$$\text{recall} = \frac{TP}{TP+FN}, \quad \text{Equation 6}$$

The evaluation result for the example is shown as Table 1.

TABLE 1

The 6 external evaluation measures applied to the clustering, pre-defined M = 5

|  | Purity | NMI | RI | F1 score | Precision | Recall |
|---|---|---|---|---|---|---|
| Lower bound | 0 | 0 | 0 | 0 | 0 | 0 |
| Maximum | 1 | 1 | 1 | 1 | 1 | 1 |
| Value for the clustering | 0.90 | 0.40 | 0.64 | 0.68 | 0.87 | 0.50 |

Table 1 shows that the specific example of the navigation system 100 operating single pass clustering method 902 has good purity and precision. Purity and precision reflects the accuracy of the process of creating POI extraction rules. Ideally, one template leads to one rule. If the cluster size is increased, though the recall might be improved, it will increase the risk of merging pages with different template into one cluster and bringing more noise into the POI extraction. If the cluster size is reduced, though there will be more clusters and lead to possible redundant extraction rules, the extraction performance will not be impacted much.

Figure 11:
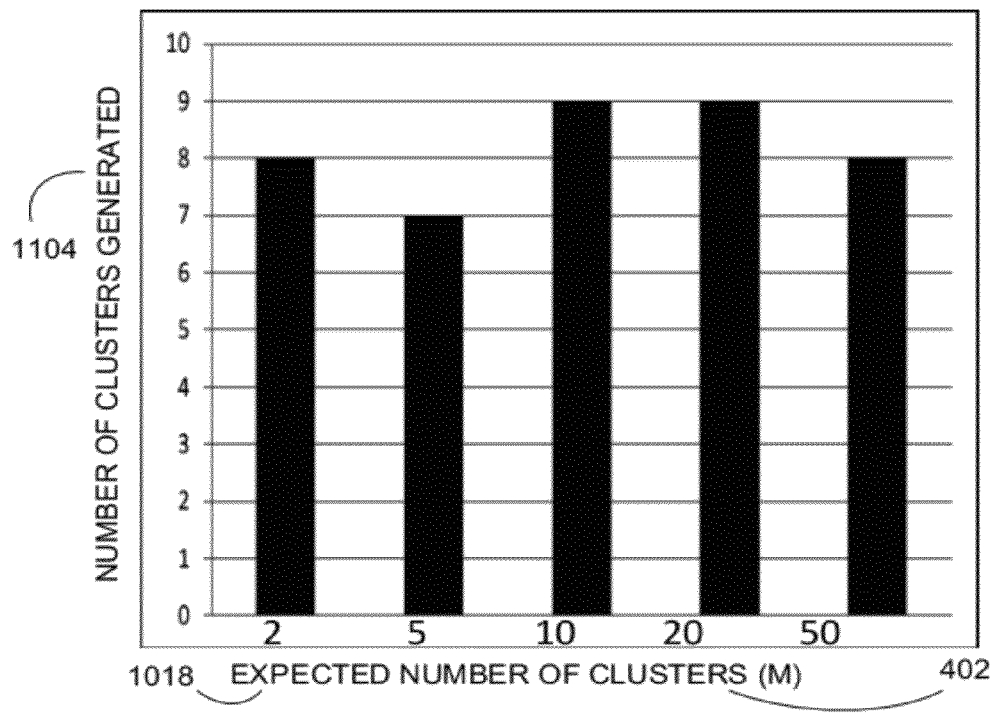
FIG. 11 is a bar graph of the number of the clusters of FIG. 4 generated across examples of the navigation system of FIG. 1.

Referring now to FIG. 11, therein is shown a bar graph of the number of the clusters 402 of FIG. 4 generated across examples of the navigation system 100 of FIG. 1. Stability is defined as how much results from the navigation system 100 changes for different ones of the user-defined percentile 1014 of FIG. 10 or the user-defined expected number 1018 of FIG. 10 of the clusters 402. One measure of stability is to compare the differences between the numbers of clusters generated for different pre-set values of the expected number 1018 of the clusters 402. Stability of the results across different runs can be an asset of a clustering method.

FIG. 11 illustrates the number of the clusters 402 generated across examples of the navigation system 100 for predefined M from 2 to 50. FIG. 11 demonstrates that the navigation system 100 is generally stable, markedly so for larger M.

Figure 12:
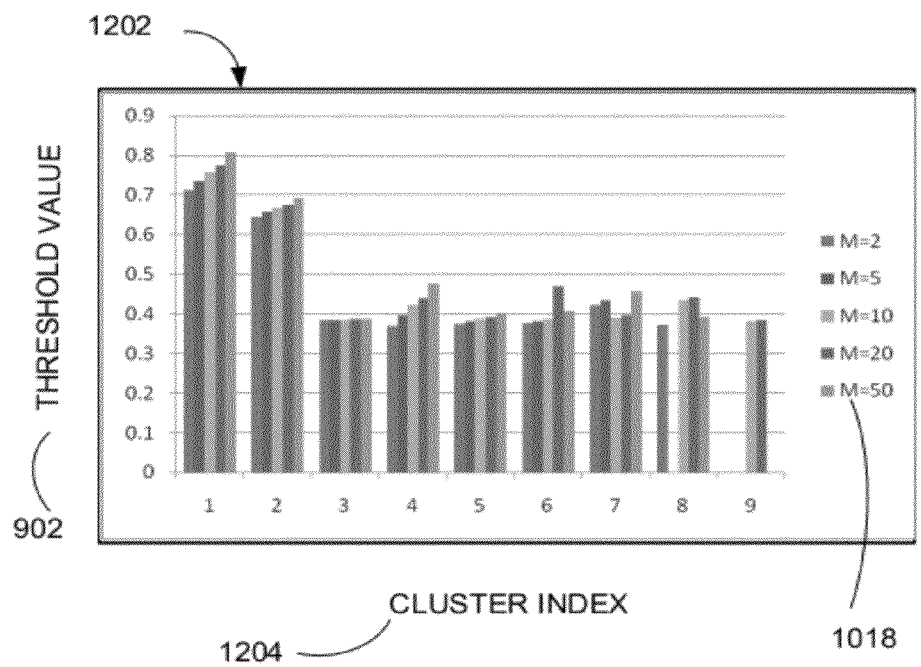
FIG. 12 is a bar graph of multiple numbers of the threshold value calculated for nine different clusters generated across five different examples of the navigation system.

Referring now to FIG. 12, therein is shown a bar graph of multiple numbers of the threshold value 904 calculated for nine different clusters generated across five different examples of the navigation system 100. The bar graph is an example of a measurement of clustering performance 1202 of the single pass clustering method 902 of FIG. 9. The bar graph illustrates that the navigation system 100 is generally stable as similar number of the clusters 402 of FIG. 4 are generated across the five different examples with the threshold value 904 similar for each of the clusters 402.

Figure 13:
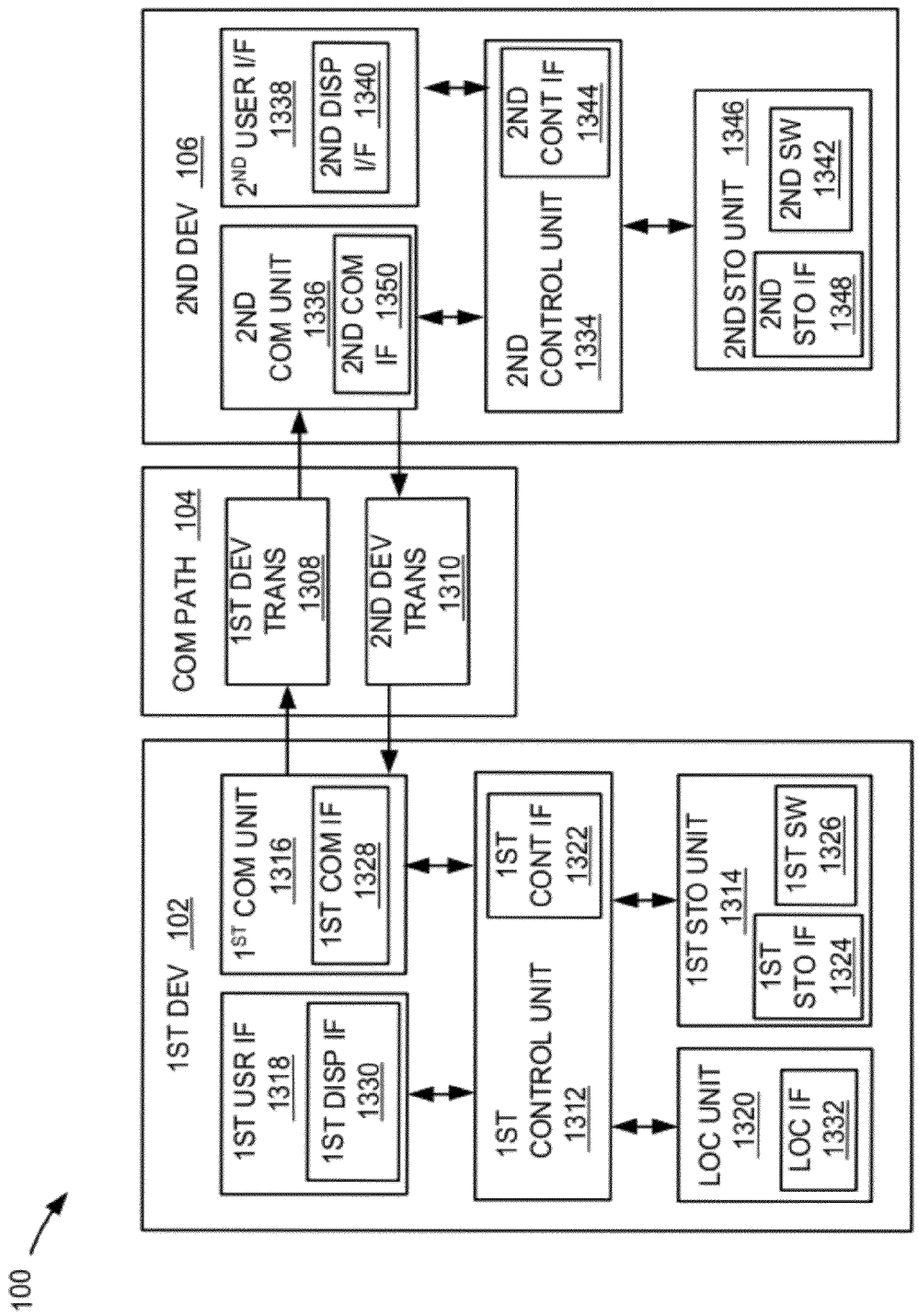
FIG. 13 is an exemplary block diagram of the navigation system.

Referring now to FIG. 13, therein is shown an exemplary block diagram of the navigation system 100. The navigation system 100 can include the first device 102 of FIG. 1, the communication path 104 of FIG. 1, and the second device 106 of FIG. 1. The first device 102 can send information in a first device transmission 1308 over the communication path 104 to the second device 106. The second device 106 can send information in a second device transmission 1310 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 1312, a first storage unit 1314, a first communication unit 1316, a first user interface 1318, and a location unit 1320. The first control unit 1312 can include a first control interface 1322. The first control unit 1312 can execute a first software 1326 to provide the intelligence of the navigation system 100. The first control unit 1312 can be implemented in a number of different manners. For example, the first control unit 1312 can be a processor, an embedded processor, a microprocessor, a hardware control logic, a hardware finite state machine (FSM), a digital signal processor (DSP), or a combination thereof. The first control interface 1322 can be used for communication between the first control unit 1312 and other functional units in the first device 102. The first control interface 1322 can also be used for communication that is external to the first device 102.

The first control interface 1322 can receive information from the other functional units or from external sources, or can transmit information to the other functional units or to external destinations. The external sources and the external destinations refer to sources and destinations external to the first device 102.

The first control interface 1322 can be implemented in different ways and can include different implementations depending on which functional units or external units are being interfaced with the first control interface 1322. For example, the first control interface 1322 can be implemented with a pressure sensor, an inertial sensor, a microelectromechanical system (MEMS), optical circuitry, waveguides, wireless circuitry, wireline circuitry, or a combination thereof.

The location unit 1320 can generate location information, current heading, and current speed of the first device 102, as examples. The location unit 1320 can be implemented in many ways. For example, the location unit 1320 can function as at least a part of a global positioning system (GPS), an inertial navigation system, a cellular-tower location system, a pressure location system, or any combination thereof.

The location unit 1320 can include a location interface 1332. The location interface 1332 can be used for communication between the location unit 1320 and other functional units in the first device 102. The location interface 1332 can also be used for communication that is external to the first device 102.

The location interface 1332 can receive information from the other functional units or from external sources, or can transmit information to the other functional units or to external destinations. The external sources and the external destinations refer to sources and destinations external to the first device 102.

The location interface 1332 can include different implementations depending on which functional units or external units are being interfaced with the location unit 1320. The location interface 1332 can be implemented with technologies and techniques similar to the implementation of the first control interface 1322.

The first storage unit 1314 can store the first software 1326. The first storage unit 1314 can also store the relevant information, such as advertisements, points of interest (POI), navigation routing entries, or any combination thereof.

The first storage unit 1314 can be a volatile memory, a nonvolatile memory, an internal memory, an external memory, or a combination thereof. For example, the first storage unit 1314 can be a nonvolatile storage such as nonvolatile random access memory (NVRAM), Flash memory, disk storage, or a volatile storage such as static random access memory (SRAM).

The first storage unit 1314 can include a first storage interface 1324. The first storage interface 1324 can be used for communication between the location unit 1320 and other functional units in the first device 102. The first storage interface 1324 can also be used for communication that is external to the first device 102.

The first storage interface 1324 can receive information from the other functional units or from external sources, or can transmit information to the other functional units or to external destinations. The external sources and the external destinations refer to sources and destinations external to the first device 102.

The first storage interface 1324 can include different implementations depending on which functional units or external units are being interfaced with the first storage unit 1314. The first storage interface 1324 can be implemented with technologies and techniques similar to the implementation of the first control interface 1322.

The first communication unit 1316 can enable external communication to and from the first device 102. For example, the first communication unit 1316 can permit the first device 102 to communicate with the second device 106 of FIG. 1, an attachment, such as a peripheral device or a computer desktop, and the communication path 104.

The first communication unit 1316 can also function as a communication hub allowing the first device 102 to function as part of the communication path 104 and not limited to be an end point or terminal unit to the communication path 104. The first communication unit 1316 can include active and passive components, such as microelectronics or an antenna, for interaction with the communication path 104.

The first communication unit 1316 can include a first communication interface 1328. The first communication interface 1328 can be used for communication between the first communication unit 1316 and other functional units in the first device 102. The first communication interface 1328 can receive information from the other functional units or can transmit information to the other functional units.

The first communication interface 1328 can include different implementations depending on which functional units are being interfaced with the first communication unit 1316. The first communication interface 1328 can be implemented with technologies and techniques similar to the implementation of the first control interface 1322.

The first user interface 1318 allows a user (not shown) to interface and interact with the first device 102. The first user interface 1318 can include an input device and an output device. Examples of the input device of the first user interface 1318 can include a keypad, a touchpad, soft-keys, a keyboard, a microphone, or any combination thereof to provide data and communication inputs.

The first user interface 1318 can include a first display interface 1330. The first display interface 1330 can include a display, a projector, a video screen, a speaker, or any combination thereof.

The first control unit 1312 can operate the first user interface 1318 to display information generated by the navigation system 100. The first control unit 1312 can also execute the first software 1326 for the other functions of the navigation system 100, including receiving location information from the location unit 1320. The first control unit 1312 can further execute the first software 1326 for interaction with the communication path 104 via the first communication unit 1316.

The second device 106 can be optimized for implementing the present invention in a multiple device embodiment with the first device 102. The second device 106 can provide the additional or higher performance processing power compared to the first device 102. The second device 106 can include a second control unit 1334, a second communication unit 1336, and a second user interface 1338.

The second user interface 1338 allows a user (not shown) to interface and interact with the second device 106. The second user interface 1338 can include an input device and an output device. Examples of the input device of the second user interface 1338 can include a keypad, a touchpad, soft-keys, a keyboard, a microphone, or any combination thereof to provide data and communication inputs. Examples of the output device of the second user interface 1338 can include a second display interface 1340. The second display interface 1340 can include a display, a projector, a video screen, a speaker, or any combination thereof.

The second control unit 1334 can execute a second software 1342 to provide the intelligence of the second device 106 of the navigation system 100. The second software 1342 can operate in conjunction with the first software 1326. The second control unit 1334 can provide additional performance compared to the first control unit 1312.

The second control unit 1334 can operate the second user interface 1338 to display information. The second control unit 1334 can also execute the second software 1342 for the other functions of the navigation system 100, including operating the second communication unit 1336 to communicate with the first device 102 over the communication path 104.

The second control unit 1334 can be implemented in a number of different manners. For example, the second control unit 1334 can be a processor, an embedded processor, a microprocessor, a hardware control logic, a hardware finite state machine (FSM), a digital signal processor (DSP), or a combination thereof.

The second control unit 1334 can include a second controller interface 1344. The second controller interface 1344 can be used for communication between the second control unit 1334 and other functional units in the second device 106. The second controller interface 1344 can also be used for communication that is external to the second device 106.

The second controller interface 1344 can receive information from the other functional units or from external sources, or can transmit information to the other functional units or to external destinations. The external sources and the external destinations refer to sources and destinations external to the second device 106.

The second controller interface 1344 can be implemented in different ways and can include different implementations depending on which functional units or external units are being interfaced with the second controller interface 1344. For example, the second controller interface 1344 can be implemented with a pressure sensor, an inertial sensor, a microelectromechanical system (MEMS), optical circuitry, waveguides, wireless circuitry, wireline circuitry, or a combination thereof.

A second storage unit 1346 can store the second software 1342. The second storage unit 1346 can also store the relevant information, such as advertisements, points of interest (POI), navigation routing entries, or any combination thereof. The second storage unit 1346 can be sized to provide the additional storage capacity to supplement the first storage unit 1314.

For illustrative purposes, the second storage unit 1346 is shown as a single element, although it is understood that the second storage unit 1346 can be a distribution of storage elements. Also for illustrative purposes, the navigation system 100 is shown with the second storage unit 1346 as a single hierarchy storage system, although it is understood that the navigation system 100 can have the second storage unit 1346 in a different configuration. For example, the second storage unit 1346 can be formed with different storage technologies forming a memory hierarchal system including different levels of caching, main memory, rotating media, or off-line storage.

The second storage unit 1346 can be a volatile memory, a nonvolatile memory, an internal memory, an external memory, or a combination thereof. For example, the second storage unit 1346 can be a nonvolatile storage such as non-volatile random access memory (NVRAM), Flash memory, disk storage, or a volatile storage such as static random access memory (SRAM).

The second storage unit 1346 can include a second storage interface 1348. The second storage interface 1348 can be used for communication between the location unit 1320 and other functional units in the second device 106. The second storage interface 1348 can also be used for communication that is external to the second device 106.

The second storage interface 1348 can receive information from the other functional units or from external sources, or can transmit information to the other functional units or to external destinations. The external sources and the external destinations refer to sources and destinations external to the second device 106.

The second storage interface 1348 can include different implementations depending on which functional units or external units are being interfaced with the second storage unit 1346. The second storage interface 1348 can be implemented with technologies and techniques similar to the implementation of the second controller interface 1344.

The second communication unit 1336 can enable external communication to and from the second device 106. For example, the second communication unit 1336 can permit the second device 106 to communicate with the first device 102 over the communication path 104.

The second communication unit 1336 can also function as a communication hub allowing the second device 106 to function as part of the communication path 104 and not limited to be an end point or terminal unit to the communication path 104. The second communication unit 1336 can include active and passive components, such as microelectronics or an antenna, for interaction with the communication path 104.

The second communication unit 1336 can include a second communication interface 1350. The second communication interface 1350 can be used for communication between the second communication unit 1336 and other functional units in the second device 106. The second communication interface 1350 can receive information from the other functional units or can transmit information to the other functional units.

The second communication interface 1350 can include different implementations depending on which functional units are being interfaced with the second communication unit 1336. The second communication interface 1350 can be implemented with technologies and techniques similar to the implementation of the second controller interface 1344.

The first communication unit 1316 can couple with the communication path 104 to send information to the second device 106 in the first device transmission 1308. The second device 106 can receive information in the second communication unit 1336 from the first device transmission 1308 of the communication path 104.

The second communication unit 1336 can couple with the communication path 104 to send information to the first device 102 in the second device transmission 1310. The first device 102 can receive information in the first communication unit 1316 from the second device transmission 1310 of the communication path 104. The navigation system 100 can be executed by the first control unit 1312, the second control unit 1334, or a combination thereof.

For illustrative purposes, the second device 106 is shown with the partition having the second user interface 1338, the second storage unit 1346, the second control unit 1334, and the second communication unit 1336, although it is understood that the second device 106 can have a different partition. For example, the second software 1342 can be partitioned differently such that some or all of its function can be in the second control unit 1334 and the second communication unit 1336. Also, the second device 106 can include other functional units not shown in FIG. 13 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 1320, although it is understood that the second device 106 can also operate the location unit 1320.

Figure 14:
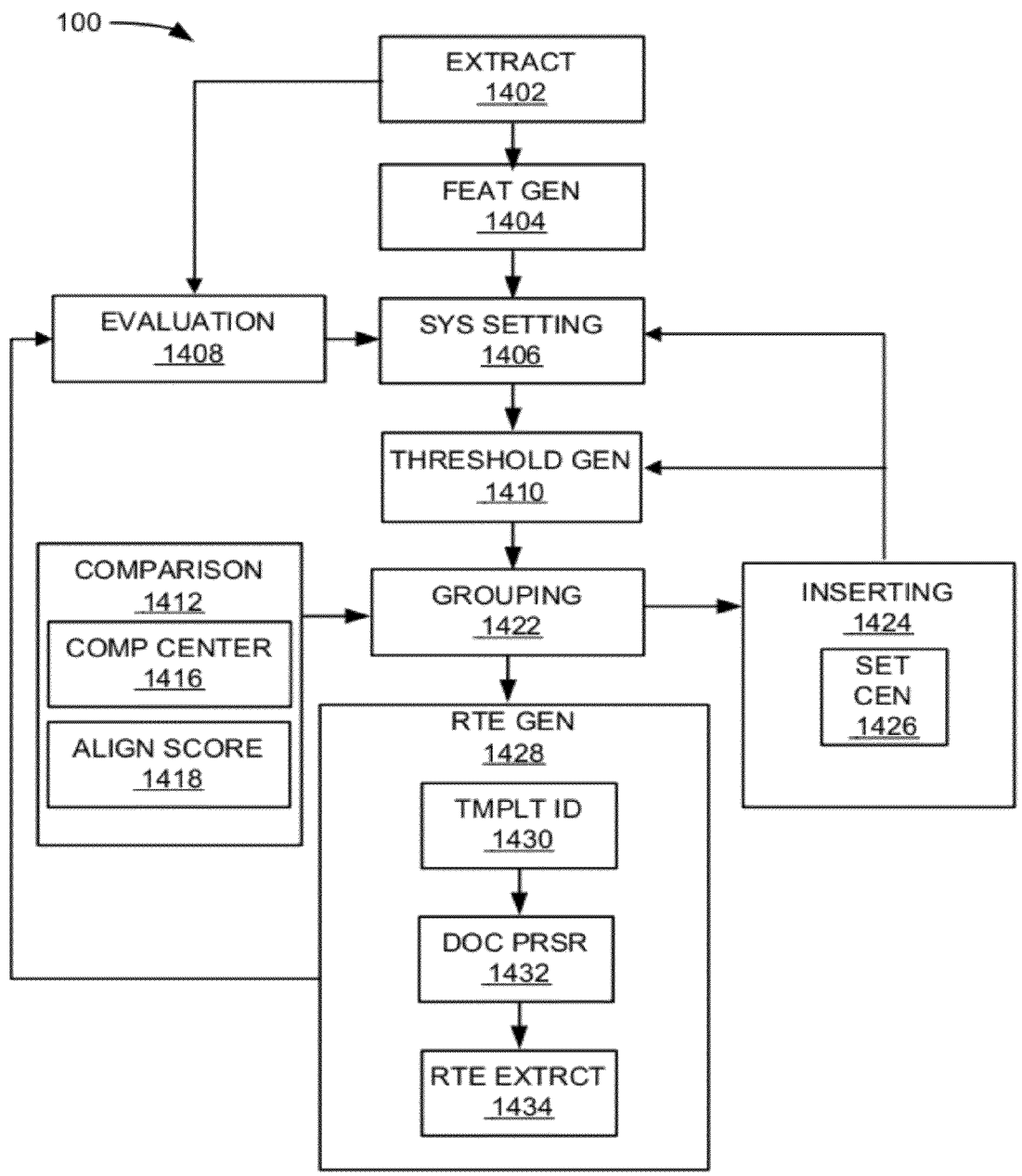
FIG. 14 is a control flow of the navigation system.

Referring now to FIG. 14, therein is shown a control flow of the navigation system 100. The navigation system 100 can include an extraction module 1402. The extraction module 1402 locates documents on the World Wide Web or other sources that provide reviews such as the review 204 containing navigation-related information. For example, the extraction module 1402 can extract the documents 201 of FIG. 2 having the point of interest 206 of FIG. 2. As another example, the extraction module 1402 can extract the navigation-related web documents 203 of FIG. 2 having the point of interest 206.

The navigation system 100 can include a feature generation module 1404. The feature generation module 1404 generates each of the formatting sequences 303 of FIG. 3 from each of the documents 201 by extracting the information contained in the standard protocols for formatting. For example, the feature generation module 1404 can generate the formatting sequence based on the XML or HTML source codes of the original document 202 of FIG. 2 for display. The feature generation module 1404 can generate the formatting sequences 303 from the navigation-related web documents 203. The feature generation module 1404 can also generate the formatting sequences 303 from the documents 201.

The navigation system 100 can include a systems setting module 1406. The systems setting module 1406 allows the user or the navigation system 100 to specify a percentile as an input to a threshold generator module 1410. This percentile represents the reciprocal fraction of an expected number of clusters, and represents an estimation of the intra-cluster similarity, the fraction of comparison values 905 that are within a particular cluster.

The systems setting module 1406 can select the user-defined percentile 1014 of FIG. 10 representing the reciprocal fraction 1016 of FIG. 10 of the expected number 1018 of the clusters 402 of FIG. 4. The systems setting module 1406 can also modify the user-defined percentile 1014 based on the output of an evaluation module 1408.

The navigation system 100 can include the evaluation module 1408. The evaluation module 1408 evaluates the clustering performance by testing out the templates in order to adjust the user-defined percentile 1014 to maximize clustering performance and stability. The evaluation module 1408 can evaluate the clustering performance 1202 of FIG. 12 to adjust the user-defined percentile 1014. Clustering performance can include any one of purity, NMI, RI, F1 score, precision, and recall.

The navigation system 100 can include the threshold generator module 1410. The threshold generator module 1410 calculates a threshold comparison value for a cluster that is used to determine whether a formatting sequence belong in the cluster. The threshold generator module 1410 can calculate the threshold value 904 of FIG. 9 for the first cluster 404 of FIG. 4 with the threshold value 904 to be equal to the user-defined percentile 1014 of the first normalized distribution 1002 of FIG. 10 of the sample comparison values 1004 of FIG. 10 between the first cluster 404 and the formatting sequence samples 1008 of FIG. 10. The first cluster 404 is from the clusters 402 of FIG. 4. The formatting sequence samples 1008 of FIG. 10 are sampled from the formatting sequences 303 of FIG. 3. The threshold generator module 1410 can also calculate a further one of the threshold value 904 for the second cluster 412 of FIG. 4.

The navigation system 100 can include a comparison module 1412. The comparison module 1412 computes numeric measure of how similar two documents are from each other by comparing the two documents' formatting sequences. The comparison module 1412 can compute the associated comparison value 903 of FIG. 9 between the first formatting sequence 710 of FIG. 7 and the first cluster 404. The comparison module 1412 includes a compare center module 1416 and an alignment score module 1418.

The compare center module 1416 extracts a formatting sequence marked as the center for a cluster from the cluster. For example, the compare center module 1416 can extract the second cluster center 420 from the second cluster 412 or extract the first cluster center 418 of FIG. 4 from the first cluster 404. The compare center module 1416 can also compute comparison values between a cluster and a single formatting sequence by comparing the center of the cluster in the form of a formatting sequence, with the single formatting sequence. The compare center module 1416 also can compute the associated comparison value 903 by comparing the first formatting sequence 710 with the first cluster center 418.

The alignment score module 1418 generates a local alignment score, an example of the associated comparison value, between a formatting sequence and another formatting sequence, such as between the first formatting sequence 710 and the first cluster center 418. The local alignment score can be based on a calculation of what percentage of the formatting sequences in question match or overlap. The local alignment score can be based on other calculation involving how likely the formatting sequence can be aligned to match another formatting sequence. For example, the alignment score module 1418 can compute the associated comparison value 903 of FIG. 9 based on aligning the first formatting sequence 710 with the first cluster center 418.

The navigation system 100 can include a grouping module 1422. The grouping module 1422 groups a formatting sequence with a cluster whenever the comparison value between the formatting sequence and the cluster exceeds the cluster's threshold. The grouping module 1422 can group the first formatting sequence 710 with the first cluster 404 when the associated comparison value 903 exceeds the threshold value 904 for the first cluster 404.

The navigation system 100 can include a cluster insertion module 1424. The cluster insertion module 1424 inserts a second cluster to the clusters whenever a formatting sequence fails to group with any cluster in the clusters. The cluster insertion module 1424 can insert the second cluster 412 to the clusters 402 containing the first formatting sequence 710 when the first formatting sequence 710 fails to group with any of existing clusters in the clusters 402.

The cluster insertion module 1424 can include a center setting module 1426. The center setting module 1426 sets the second cluster center 420 of FIG. 4 as the formatting sequence first to be included in the second cluster 412. The center setting module 1426 can set the first cluster center 418 as the first formatting sequence 710, if the first formatting sequence 710 is the formatting sequence first to be included in the first cluster 404. The center setting module 1426 can also set the second cluster center 420 as the first formatting sequence 710 if the first formatting sequence 710 is the formatting sequence first to be included in the second cluster 412.

The navigation system 100 can include a route generation module 1428. The route generation module 1428 generates a travel route based on the navigation-related information extracted from the documents 201, where the extraction is based on the templates 302 generated for each of the clusters 402. The route generation module 1428 can generate the travel route 806 of FIG. 8 for the point of interest 206 of FIG. 2 related to the first cluster 404 for displaying on the first device 102 of FIG. 1 or the second device 106 of FIG. 1. The route generation module 1428 can also generate the travel route 806 for the point of interest 206 related to the second cluster 412 for displaying on the first device 102 or the second device 106.

The route generation module 1428 can include a template ID module 1430, a document parsing module 1432, and a route extraction module 1434. The template ID module 1430 creates the templates 302 from the formatting sequences 303 grouped together in the clusters 402, each cluster having a matching template. The template ID module 1430 can identify the first template 304 matched with the first cluster 404. The template ID module 1430 can also identify the second template 306 matched with the second cluster 412.

The document parsing module 1432 parses the documents 201 within the clusters 402 with the templates 302 generated from the clusters 402. The document parsing module 1432 can parse the point-of-interest page 602 of FIG. 6 related to the point of interest 206 from the documents 201 by using the template 302.

The route extraction module 1434 generates a travel route for the point of interest from the point-of-interest pages containing information relating to the point of interest. The route extraction module 1434 can generate the travel route 806 for the point of interest 206 from the point-of-interest page 602.

The physical transformation from displaying the travel route 806 result in movement in the physical world, such as people operating the first device 102, the vehicle, or a combination thereof, based on the operation of the navigation system 100. The user of the navigation system 100 can select the point of interest 206 from the point-of-interest page 602 after considering the point-of-interest page 602 of FIG. 6. The current location 808 can start from where the user had selected the point of interest 206, and the travel route 806 can start from the current location 808 of FIG. 8 to the point of interest 206. As the movement in the physical world occurs, the movement itself creates additional information that is converted back to the current location 808 for the continued operation of the navigation system 100 and to continue the movement in the physical world.

Figure 15:
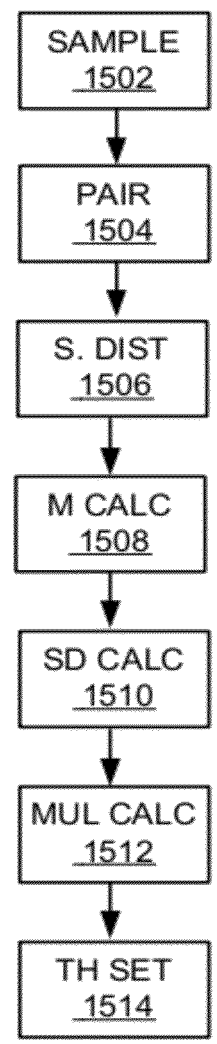
FIG. 15 is a control flow of the threshold generator module.

Referring now to FIG. 15, therein is shown a control flow of the threshold generator module 1410. The threshold generator module 1410 includes a sampling module 1502, a pairs generation module 1504, a sample distribution module 1506, a mean calculation module 1508, a standard deviation calculation module 1510, a multiplier calculation module 1512, and a threshold setting module 1514.

The sampling module 1502 samples the formatting sequences 303 of FIG. 3 generating the formatting sequence samples 1008 of FIG. 10. The pairs generation module 1504 generates the matching pairs 1006 of FIG. 10 by matching the first cluster 404 of FIG. 4 with the formatting sequence samples 1008. For example, if there are five sample formatting sequences, there will be five pairs generated. The sample distribution module 1506 computes the sample comparison values 1004 of FIG. 10 from the matching pairs 1006 of FIG. 10.

The mean calculation module 1508 calculates the sample mean 1010 of FIG. 10 of the sample comparison values 1004. The standard deviation calculation module 1510 calculates the sample standard deviation 1012 of FIG. 10 of the sample comparison values 1004. The mean and the standard deviation are used to characterize the first normalized distribution 1002 of FIG. 10. The first normalized distribution 1002 follows a normal curve, and a specific comparison value can be determined for specific percentile of the first normalized distribution 1002.

The multiplier calculation module 1512 sets the multiplier as how many standard deviations above the sample mean 1010 is the user-defined percentile 1014 of FIG. 10 in the first normalized distribution 1002. The threshold setting module 1514 sets the threshold value 904 to be the sample mean 1010 plus the sample standard deviation 1012 multiply by the multiplier 1022 of FIG. 10.

The first software 1326 of FIG. 13 of the first device 102 of FIG. 13 can include the navigation system 100. For example, the first software 1326 can include the extraction module 1402, the feature generation module 1404, the systems setting module 1406, the threshold generator module 1410, the comparison module 1412, the grouping module 1422, and the route generation module 1428.

The first control unit 1312 of FIG. 13 can execute the first software 1326 for the extraction module 1402 to extract the navigation-related web documents 203. The first control unit 1312 can execute the first software 1326 for the feature generation module 1404 to generate the formatting sequences 303. The first control unit 1312 can execute the first software 1326 for the systems setting module 1406 to select the user-defined percentile 1014.

The first control unit 1312 can execute the first software 1326 for the threshold generator module 1410 to calculate the threshold value 904. The first control unit 1312 can execute the first software 1326 for the comparison module 1412 to compute the associated comparison value 903. The first control unit 1312 can execute the first software 1326 for the grouping module 1422 to group the first formatting sequence 710 the first cluster 404.

The first control unit 1312 can execute the first software 1326 for the route generation module 1428 to generate the travel route 806. The first control unit 1312 can execute the first display interface 1330 of FIG. 13 to display the travel route 806.

The second software 1342 of FIG. 13 of the second device 106 of FIG. 13 can include the navigation system 100. For example, the second software 1342 can include the extraction module 1402, the feature generation module 1404, the systems setting module 1406, the threshold generator module 1410, the comparison module 1412, the grouping module 1422, and the route generation module 1428.

The second control unit 1334 of FIG. 13 can execute the second software 1342 for the extraction module 1402 to extract the documents 201. The second control unit 1334 can execute the second software 1342 for the feature generation module 1404 to generate the formatting sequences 303. The second control unit 1334 can execute the second software 1342 for the systems setting module 1406 to select the user-defined percentile 1014.

The second control unit 1334 can execute the second software 1342 for the threshold generator module 1410 to calculate the threshold value 904. The second control unit 1334 can execute the second software 1342 for the comparison module 1412 to generate the revised associated comparison value. The second control unit 1334 can execute the second software 1342 for the grouping module 1422 to group the first formatting sequence 710 with the first cluster 404.

The second control unit 1334 can execute the second software 1342 for the route generation module 1428 to generate the travel route 806. The second control unit 1334 can execute the second display interface 1340 of FIG. 13 to display the travel route 806.

The navigation system 100 can be partitioned between the first software 1326 and the second software 1342. For example, the second software 1342 can include the feature generation module 1404, the systems setting module 1406, the threshold generator module 1410, the comparison module 1412, the grouping module 1422, and the route generation module 1428. The second control unit 1334 can execute modules partitioned on the second software 1342 as previously described.

The first software 1326 can include the extraction module 1402. Based on the size of the first storage unit 1314, the first software 1326 can include additional modules of the navigation system 100. The first control unit 1312 can execute the modules partitioned on the first software 1326 as previously described.

The first user interface 1318 of FIG. 13 can receive the entry 804 by the user, the navigation system 100, or a combination thereof for the extraction module 1402. The first control unit 1312 can operate the first communication unit 1316 to send the entry 804 to the second device 106. The first control unit 1312 can operate the first software 1326 to operate the location unit 1320.

The second communication unit 1336 of FIG. 13 can send the travel route 806 to the first device 102 through the communication path 104 of FIG. 13. The travel route 806 can be displayed on the first display interface 1330 and the second device 106.

It has been discovered that the present invention provides the navigation system 100 for a safer operation of the vehicle, the navigation system 100, and other user interface system within the vehicle. By generating the templates 302 matched to the clusters 402, the navigation system 100 can parse the documents 201 using the templates 302 accurately, and display the point-of-interest page 602 and the travel route 806 accurately. The displaying of the travel guide 702 including the point-of-interest page 602 and the travel route 806 reduces the exposure of harm by permitting the user to make decision for traveling to the point of interest 206 based on accurate information. As a result, displaying the travel guide 702 can aid the user of safer operation of the vehicle.

The navigation system 100 describes the module functions or order as an example. The modules can be partitioned differently. For example, the mean calculation module 1508 and the standard deviation calculation module 1510 can be combined. Each of the modules can operate individually and independently of the other modules.

Furthermore, data generated in one module can be used by another module without being directly coupled to each other. For example, the route generation module 1428 can receive the entry 804 for the point of interest 206 from the extraction module 1402.

Figure 16:
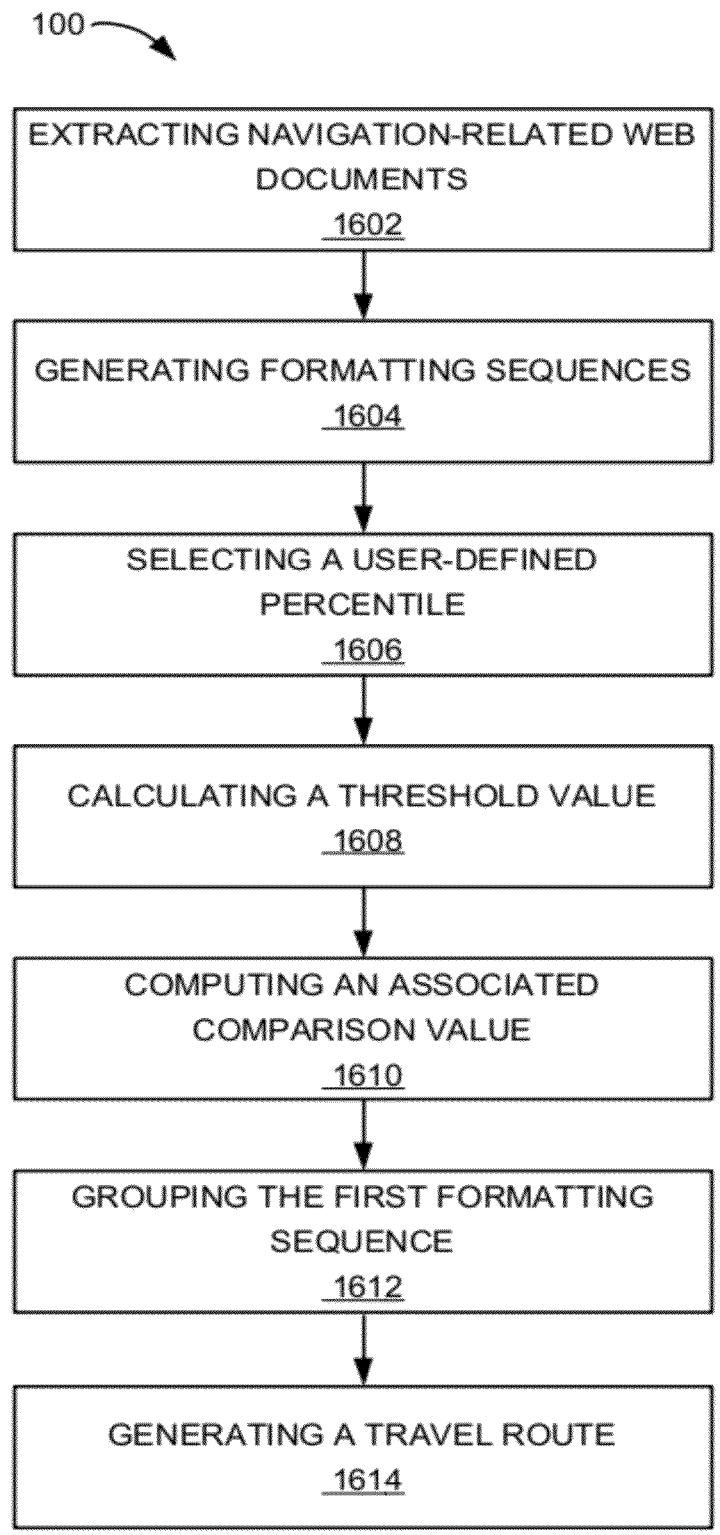
FIG. 16 is a flow chart of a method of operation of the navigation system in a further embodiment of the present invention.

Referring now to FIG. 16, therein is shown a flow chart of a method 1600 of operation of the navigation system 100 in a further embodiment of the present invention. The method 900 includes: extracting navigation-related web documents having a point of interest in a block 1602; generating formatting sequences of the navigation-related web documents in a block 1604; selecting a user-defined percentile representing reciprocal fraction of an expected number of clusters in a block 1606; calculating a threshold value for a first cluster with the threshold value to be equal to the user-defined percentile of a first normalized distribution of sample comparison values between the first cluster and formatting sequence samples from the formatting sequences, the first cluster is from the clusters in a block 1608; computing an associated comparison value between a first formatting sequence from the formatting sequences and the first cluster in a block 1610; grouping the first formatting sequence with the first cluster when the associated comparison value exceeds the threshold value for the first cluster in a block 1612; and generating a travel route for the point of interest related to the first cluster for displaying on a device in a block 1614.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   extracting navigation-related web documents having a point of interest;
   generating formatting sequences of the navigation-related web documents;
   selecting a user-defined percentile representing reciprocal fraction of an expected number of clusters;
   calculating a threshold value for a first cluster with the threshold value to be equal to the user-defined percentile of a first normalized distribution of sample comparison values between the first cluster and formatting sequence samples from the formatting sequences, the first cluster is from the clusters;
   computing an associated comparison value between a first formatting sequence from the formatting sequences and the first cluster;
   grouping the first formatting sequence with the first cluster when the associated comparison value exceeds the threshold value for the first cluster; and
   generating a travel route for the point of interest related to the first cluster for displaying on a device.

2. The method as claimed in claim 1 wherein calculating the threshold value includes:
   generating the formatting sequence samples by sampling the formatting sequences;
   generating pairs by matching the first cluster with the formatting sequence samples;
   computing the sample comparison values from the pairs;
   calculating a mean of the sample comparison values;
   calculating a standard deviation of the sample comparison values;
   determining a multiplier corresponding to the user-defined percentile of the first normalized distribution, with the multiplier being the user-defined percentile of standard deviations above the mean; and
   setting the threshold value to be the mean plus the standard deviation multiplied by the multiplier.

3. The method as claimed in claim 1 further comprising:
   inserting a second cluster to the clusters containing the first formatting sequence when the associated comparison value does not exceed the threshold value for the first cluster; and
   generating the travel route for the point of interest related to the second cluster for displaying on the device;
   wherein inserting the second cluster includes:
   calculating the threshold value for the second cluster; and
   decreasing the user-defined percentile after the second cluster is inserted.

4. The method as claimed in claim 3 wherein:
   inserting the second cluster includes setting a second cluster center as the first formatting sequence; and
   computing the associated comparison value includes computing the associated comparison value by comparing the first formatting sequence with the second cluster center.

5. The method as claimed in claim 1 further comprising evaluating clustering performance to adjust the user-defined percentile.

6. A method of operation of a document clustering system comprising:
- generating formatting sequences of documents;
- selecting a user-defined percentile representing reciprocal fraction of an expected number of clusters;
- calculating a threshold value for a first cluster with the threshold value to be equal to the user-defined percentile of a first normalized distribution of sample comparison values between the first cluster and formatting sequence samples from the formatting sequences, the first cluster is from the clusters;
- computing an associated comparison value between a first formatting sequence from the formatting sequences and the first cluster;
- grouping the first formatting sequence with the first cluster when the associated comparison value exceeds the threshold value for the first cluster;
- identifying a template matched with the first cluster;
- generating a point-of-interest page related to a point of interest from the documents using the template; and
- generating a travel route for a point of interest from the point-of-interest page for displaying on a device.

7. The method as claimed in claim 6 wherein selecting a user-defined percentile includes at least one of:
- selecting the user-defined percentile from a fraction experimentally optimized for clustering performance; and
- selecting the user-defined percentile from a reciprocal percentile of expected number of templates used in formation of the documents.

8. The method as claimed in claim 6 wherein computing the associated comparison value includes:
- extracting a first cluster center from the first cluster; and
- computing the associated comparison value based on aligning the first formatting sequence with the first cluster center.

9. A navigation system comprising:
- an extraction module, for extracting with a control unit navigation-related web documents having a point of interest;
- a feature generation module, coupled to the extraction module, for generating formatting sequences of the navigation-related web documents;
- a systems setting module for selecting a user-defined percentile representing reciprocal fraction of an expected number of clusters;
- a threshold generator module, coupled to the systems setting module, the document processing module, and the clusters module, for calculating a threshold value for a first cluster with the threshold value to be equal to the user-defined percentile of a first normalized distribution of sample comparison values between the first cluster and formatting sequence samples from the formatting sequences, the first cluster is from the clusters;
- a comparison module, coupled to the feature generation module, and the threshold generator module, for computing an associated comparison value for computing an associated comparison value between a first formatting sequence from the formatting sequences and the first cluster;
- a grouping module, coupled to the comparison module, the document processing module, and the threshold generator module, for grouping the first formatting sequence with the first cluster when the associated comparison value exceeds the threshold value for the first cluster; and
- a route generation module, coupled to the grouping module, for generating a travel route for the point of interest related to the first cluster for displaying on a device.

10. The system as claimed in claim 9 further comprising:
- a sampling module, coupled to the threshold generator module, for generating the formatting sequence samples by sampling the formatting sequences;
- a pairs generation module, coupled to the threshold generator module, for generating pairs by matching the first cluster with the formatting sequence samples;
- a sample distribution module, coupled to the threshold generator module, for computing the sample comparison values from the pairs;
- a mean calculation module, coupled to the threshold generator module, for calculating a mean of the sample comparison values;
- a standard deviation calculation module, coupled to the threshold generator module, for calculating a standard deviation of the sample comparison values;
- a multiplier calculation module, coupled to the threshold generator module, for determining a multiplier corresponding to the user-defined percentile of the first normalized distribution, with the multiplier being the user-defined percentile of standard deviations above the mean; and
- a threshold setting module, coupled to the threshold generator module, for setting the threshold value to be the mean plus the standard deviation multiplied by the multiplier.

11. The system as claimed in claim 9 further comprising:
- a cluster insertion module, coupled to the comparison module, the feature generation module, and the threshold generator module, inserting a second cluster to the clusters containing the first formatting sequence when the associated comparison value does not exceed the threshold value for the first cluster;

wherein:
- the route generation module is for generating a travel route for the point of interest related to the second cluster for displaying on a device;
- the threshold generator module is for calculating a new threshold value for the second cluster; and
- the systems setting module is for decreasing the user-defined percentile after the second cluster is inserted.

12. The system as claimed in claim 11 further comprising:
- a center setting module, coupled to the cluster insertion module, for setting a second cluster center as the first formatting sequence; and
- a compare center module, coupled to the comparison module, for computing the associated comparison value by comparing the first formatting sequence with the second cluster center.

13. The system as claimed in claim 9 further comprising an evaluation module, coupled to the systems setting module, the feature generation module, and route generation module, for evaluating clustering performance to adjust the user-defined percentile.

14. The system as claimed in claim 9 wherein:
- the extraction module is for extracting documents having the point of interest; and
- the feature generation module is for adding to the formatting sequences of the documents.

15. The system as claimed in claim 14 further comprising a template identification module, coupled to the route generation module and the feature generation module, for identifying a template matched with the first cluster.

16. The system as claimed in claim 15 further comprising:
- a document parsing module, coupled to the feature generation module and the template identification module, for generating a point-of-interest page related to the point of interest from the documents by using the template; and
- a route extraction module, coupled to the document parsing module, for generating the travel route for the point of interest from the point-of-interest page.

17. The system as claimed in claim 14 wherein the systems setting module is for selecting the user-defined percentile from a fraction experimentally optimized for clustering performance and from a reciprocal percentile of expected number of templates used in formation of the documents.

18. The system as claimed in claim 14 further comprising:
- a compare center module, coupled to the comparison module, for extracting a first cluster center from the first cluster; and
- an alignment score module, coupled to the comparison module, for computing the associated comparison value based on aligning the first formatting sequence with the first cluster center.

\* \* \* \* \*